(12) United States Patent
Douglas et al.

(10) Patent No.: US 7,558,852 B2
(45) Date of Patent: *Jul. 7, 2009

(54) TAG LOCATION, CLIENT LOCATION, AND COVERAGE HOLE LOCATION IN A WIRELESS NETWORK

(75) Inventors: Bretton Lee Douglas, San Jose, CA (US); Timothy S. Olson, San Jose, CA (US); David E. Halasz, Stow, OH (US); John Z. Deng, Canton, OH (US); Arnold M. Bilstad, Redwood City, CA (US); Sheausong Yang, Saratoga, CA (US); Richard D. Rebo, North Royalton, OH (US); Jonathan S. Leary, Boston, MA (US); Daryl A. Kaiser, Los Gatos, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/842,549

(22) Filed: Aug. 21, 2007

(65) Prior Publication Data

US 2007/0281714 A1 Dec. 6, 2007

Related U.S. Application Data

(63) Continuation of application No. 11/286,086, filed on Nov. 22, 2005, now Pat. No. 7,293,088, and a continuation-in-part of application No. 10/629,384, filed on Jul. 28, 2003, now Pat. No. 6,990,428.

(60) Provisional application No. 60/649,721, filed on Feb. 3, 2005.

(51) Int. Cl.
*G06F 15/173* (2006.01)

(52) U.S. Cl. .............. 709/224; 709/236; 455/404.2; 455/456.1

(58) Field of Classification Search ......... 709/223–236; 455/404.2, 456.1
See application file for complete search history.

(56) References Cited

U.S. PATENT DOCUMENTS 4,254,467 A 3/1981 Davis et al. ............... 345/443

(Continued)

FOREIGN PATENT DOCUMENTS

EP 0 930 514 A2 7/1999

(Continued)

OTHER PUBLICATIONS

Office action for US Patent No. 7,293,088 mailed Dec. 15, 2006.

(Continued)

*Primary Examiner*—Phuoc Nguyen
(74) *Attorney, Agent, or Firm*—Dov Rosenfeld; INVENTEK

(57) ABSTRACT

Determining the location of a radio tag or client station of a wireless network, and the location of coverage holes by receiving from a plurality of wireless stations of the wireless network path loss information of the path loss of one or more location frames received at the respective wireless stations. The location frames transmitted by the radio tag or client station having a pre-defined frame structure. The radio tags and client stations use a common infrastructure for transmitting a location frame configured for radiolocation by path loss measurement. The common infrastructure includes a pre-defined protocol common for both radio tags and client stations for transmitting information for reception by the plurality of stations of the wireless network for radiolocation. The pre-defined protocol includes using the location frame having the pre-defined frame structure.

23 Claims, 25 Drawing Sheets

U.S. PATENT DOCUMENTS

| | | | | |
|---|---|---|---|---|
| 5,028,848 | A | 7/1991 | Bankston et al. | 315/364 |
| 5,327,144 | A | 7/1994 | Stilp et al. | 342/387 |
| 5,375,140 | A * | 12/1994 | Bustamante et al. | 455/443 |
| 5,394,158 | A | 2/1995 | Chia | 342/457 |
| 5,396,582 | A | 3/1995 | Kahkoska | 358/1.3 |
| 5,564,079 | A | 10/1996 | Olsson | 455/54.1 |
| 5,570,412 | A | 10/1996 | LeBlanc | 379/58 |
| 5,666,662 | A | 9/1997 | Shibuya | 455/456.4 |
| 5,717,406 | A | 2/1998 | Sanderford et al. | 342/457 |
| 5,732,354 | A | 3/1998 | MacDonald | 455/456.2 |
| 5,945,948 | A * | 8/1999 | Buford et al. | 342/457 |
| 6,112,095 | A | 8/2000 | Wax et al. | 455/456 |
| 6,115,605 | A | 9/2000 | Siccardo et al. | 455/426 |
| 6,134,338 | A | 10/2000 | Solberg et al. | 382/113 |
| 6,134,448 | A | 10/2000 | Shoji et al. | 455/456 |
| 6,140,964 | A | 10/2000 | Sugiura et al. | 342/464 |
| 6,167,274 | A | 12/2000 | Smith | 455/456.3 |
| 6,198,935 | B1 | 3/2001 | Saha et al. | 455/456 |
| 6,212,391 | B1 | 4/2001 | Saleh et al. | 455/456 |
| 6,226,400 | B1 | 5/2001 | Doll | 382/163 |
| 6,236,365 | B1 * | 5/2001 | LeBlanc et al. | 342/457 |
| 6,243,811 | B1 | 6/2001 | Patel | 713/167 |
| 6,249,252 | B1 | 6/2001 | Dupray | 342/450 |
| 6,259,406 | B1 | 7/2001 | Sugiura et al. | 342/457 |
| 6,269,246 | B1 | 7/2001 | Rao et al. | 455/456 |
| 6,272,541 | B1 | 8/2001 | Cromer et al. | 709/224 |
| 6,275,190 | B1 | 8/2001 | Sugiura et al. | 342/464 |
| 6,282,427 | B1 | 8/2001 | Larsson et al. | 455/456 |
| 6,304,218 | B1 | 10/2001 | Sugiura et al. | 342/464 |
| 6,317,599 | B1 | 11/2001 | Rappaport et al. | 455/446 |
| 6,317,604 | B1 | 11/2001 | Kovach, Jr. et al. | 455/456.5 |
| 6,414,634 | B1 | 7/2002 | Tekinay | 342/453 |
| 6,415,155 | B1 | 7/2002 | Koshima et al. | 455/456 |
| 6,441,777 | B1 | 8/2002 | McDonald | 342/357.06 |
| 6,456,892 | B1 | 9/2002 | Dara-Abrams et al. | 700/83 |
| 6,473,038 | B2 | 10/2002 | Patwari et al. | 342/450 |
| 6,526,283 | B1 | 2/2003 | Jang | 455/456 |
| 6,556,942 | B1 | 4/2003 | Smith | 702/150 |
| 6,581,000 | B2 | 6/2003 | Hills et al. | 701/207 |
| 6,664,925 | B1 | 12/2003 | Moore et al. | 342/451 |
| 6,674,403 | B2 | 1/2004 | Gray et al. | 342/463 |
| 6,704,352 | B1 | 3/2004 | Johnson | 375/224 |
| 6,728,782 | B1 | 4/2004 | D'Souza et al. | 709/242 |
| 6,754,488 | B1 | 6/2004 | Won et al. | 455/424 |
| 6,766,453 | B1 | 7/2004 | Nessett et al. | 713/171 |
| 6,799,047 | B1 | 9/2004 | Bahl et al. | 455/456.1 |
| 6,804,394 | B1 | 10/2004 | Hsu | 382/173 |
| 6,810,428 | B1 | 10/2004 | Larsen et al. | 709/238 |
| 6,850,946 | B1 | 2/2005 | Rappaport et al. | 707/101 |
| 6,990,428 | B1 | 1/2006 | Kaiser et al. | 702/150 |
| 7,123,924 | B2 * | 10/2006 | Cuffaro | 455/456.1 |
| 2002/0036569 | A1 * | 3/2002 | Martin | 340/573.1 |
| 2002/0045424 | A1 | 4/2002 | Lee | 455/41.2 |
| 2002/0102988 | A1 | 8/2002 | Myllymaki | 455/456 |
| 2002/0115445 | A1 | 8/2002 | Myllymaki | 455/456 |
| 2002/0118118 | A1 | 8/2002 | Myllymaki et al. | 340/686.1 |
| 2002/0154134 | A1 | 10/2002 | Matsui | 345/582 |
| 2002/0168958 | A1 | 11/2002 | Ford et al. | 455/404 |
| 2002/0174335 | A1 | 11/2002 | Zhang et al. | 713/168 |
| 2002/0176366 | A1 | 11/2002 | Ayyagari et al. | 370/245 |
| 2003/0117985 | A1 | 6/2003 | Fujii et al. | 370/338 |
| 2003/0130987 | A1 | 7/2003 | Edlund et al. | 707/3 |
| 2003/0135486 | A1 | 7/2003 | Edlund et al. | 707/3 |
| 2003/0135762 | A1 | 7/2003 | Macaulay | 713/201 |
| 2004/0066757 | A1 | 4/2004 | Molteni et al. | 370/329 |
| 2004/0072577 | A1 | 4/2004 | Myllymaki et al. | 455/456.1 |
| 2004/0111397 | A1 | 6/2004 | Chen et al. | 707/3 |
| 2004/0151377 | A1 | 8/2004 | Boose et al. | 382/193 |
| 2004/0166878 | A1 | 8/2004 | Erskine et al. | 455/456.1 |
| 2004/0176108 | A1 | 9/2004 | Misikangas | 455/456.5 |
| 2004/0186847 | A1 | 9/2004 | Rappaport et al. | 707/101 |
| 2004/0198373 | A1 | 10/2004 | Ford et al. | 455/456.1 |
| 2004/0198392 | A1 | 10/2004 | Harvey et al. | 455/456.1 |
| 2004/0203910 | A1 | 10/2004 | Hind et al. | 455/456.1 |
| 2004/0236547 | A1 | 11/2004 | Rappaport et al. | 703/2 |
| 2004/0259554 | A1 | 12/2004 | Rappaport et al. | 455/446 |
| 2004/0259555 | A1 | 12/2004 | Rappaport et al. | 455/446 |
| 2005/0128139 | A1 | 6/2005 | Misikangas et al. | 342/350 |
| 2005/0131635 | A1 | 6/2005 | Myllymaki et al. | 701/205 |
| 2005/0136944 | A1 | 6/2005 | Misikangas et al. | 455/456.1 |
| 2005/0185615 | A1 | 8/2005 | Zegelin | 370/331 |
| 2005/0185618 | A1 | 8/2005 | Friday et al. | 370/331 |
| 2005/0195109 | A1 | 9/2005 | Davi et al. | 342/463 |
| 2005/0197136 | A1 | 9/2005 | Friday et al. | 455/456.1 |
| 2005/0208952 | A1 | 9/2005 | Dietrich et al. | 455/456.1 |
| 2005/0261004 | A1 | 11/2005 | Dietrich et al. | 455/456.2 |

FOREIGN PATENT DOCUMENTS

| | | |
|---|---|---|
| EP | 0 967 816 A1 | 12/1999 |
| EP | 1 018 457 A1 | 7/2000 |
| EP | 1 296 531 A1 | 3/2003 |
| EP | 1 301 055 A1 | 4/2003 |
| JP | 02044929 | 2/1990 |
| WO | WO 97/33386 | 9/1997 |
| WO | WO 98/41048 | 9/1998 |
| WO | WO 99/08909 | 2/1999 |
| WO | WO 02/43425 A1 | 5/2002 |
| WO | WO 02/054813 A1 | 7/2002 |
| WO | WO 03/023443 A2 | 3/2003 |

OTHER PUBLICATIONS

Office action for US Patent No. 7,293,088 mailed Mar. 23, 2007.

"Ekahau Logical Areas—location enabling the Wi-Fi network." Apr. 4, 2003. Ekahau, Inc., Saratoga, CA. Company's URL: www.ekahau.com.

"Ekahau Positioning Engine 2.0: Product Overview." Apr. 4, 2003. Ekahau, Inc., Saratoga, CA. URL: http://www.ekahau.com/products/positioningengine/.

"Corporate Fact Sheet." Aruba Wireless Networks, San Jose, CA. URL: http://www.arubanetworks.com/pdf/corporate_fact_sheet.pdf, Aug. 2005.

"Airwave Rogue Access Point Detection." 2002. Airwave Wireless, Inc. San Mateo, CA. URL: http://airwave.com/features.html.

Geier, J. "Identifying Rogue Access Points." Jan. 6, 2003. Wi-Fi Planet Tutorials. URL: http://www.wi-fiplanet.com/tutorials/article.php/1564431.

Brewin, B. "IBM Develops Tool to Detect Rogue Wireless LAN Access Points." Jun. 17, 2002. Computerworld, Framingham, MA. URL: http://www.computerworld.com/mobiletopics/mobile/story/0,10801,72065,00.html.

Bulusu, N., Heidemann, J., Estrin, D. "GPS-less Low Cost Outdoor Localization for Very Small Devices." *IEEE Personal Communications*, Oct. 2000. URL: http://lecs.cs.ucla.edu/~bulusu/papers/Bulusu00a.pdf.

"AeroScout WLAN Location System." Downloaded on Nov. 10, 2003 from http://www.bluesoft-inc.com/wlan.asp Bluesoft, Inc., San Mateo, CA.

"Cognio Announces Breakthrough Location Technology for WLAN Deployments." Downloaded on Nov. 10, 2003 from http://www.cognio.com/press_detail.asp?itemID=70 Cognio, Inc., Waltham, MA.

"WhereNet Main Page." Downloaded Nov. 10, 2003 from http://www.wherenet.com/ WhereNet, Santa Clara, CA.

"Ekahau Positioning Engine 2.0: Data Sheet." Apr. 4, 2003. Ekahau, Inc., Saratoga, CA. URL: http://www.ekahau.com/pdf/EPE_2.0_datasheet.PDF.

"Indoor Positioning in 802.11b Networks." Arp. 4, 2003.

Ekahau, Inc., Saratoga, CA. URL: http://www.ekahau.com/products/positioningengine/features.html.

"InFielder." Apr. 22, 2003. Wireless Valley, Austin, TX. URL: http://www.wirelessvalley.com/Products/InFielder/InFielder.asp.

"LANFielder." Apr. 22, 2003. Wireless Valley, Austin, TX. URL: http://www.wirelessvalley.com/Products/LANFielder/LANFielder.asp.

"Optimatic." Apr. 22, 2003. Wireless Valley, Austin, TX. URL: http://wirelessvalley.com/Products/Optimatic/Optimatic.asp.

"Predictor." Apr. 22, 2003. Wireless Valley, Austin, TX. URL: http://www.wirelssvalley.com/Products/Predictor/Predictor.asp.

"LANFielder Product Literature." Wireless Valley, Austin, TX. URL: http://www.wirelessvalley.com/Assets/brochures/LanFielder.pdf, Feb. 2004.

Conley, C. . "Securing WLANS with Location-Enabled Networks." *Wireless Security Perspectives*, vol. 5,No. 3.Mar. 2003. Organization's URL: www.cnp-wireless.com/wsp.html.

"Company Information." Apr. 6, 2004. Corsair Communications:A LightBridge Company, Burlington, MA. Company's URL: www.lightbridge.com.

Small, J., Smailagic, A., and Siewiorek, D.P. "Determining User Location For Context Aware Computing Through the Use of a Wireless LAN Infrastructure." Institute for Complex Engineered Systems. Carnegie-Mellon University, Pittsburgh, PA, 2000. Available at http://www-2.cs.cmu.edu/~aura/docdir/small00.pdf.

Bahl, P. and Padmanabhan, V.N. "RADAR: An In-Building RF-based User Location and Tracking System." IEEE Infocom 2000, vol. 2, Mar. 2000, pp. 775-784.

Kishan, A., Michael, M., Rihan, S., and R. Biswas. "Halibut: An Infrastructure for Wireless LAN Location-Based Services." Technical paper for Course CS444n, Computer Science Department, Stanford University, Stanford CA, Jun. 2001. Previously available at http://fern2.stanford.edu/cs444n/paper.pdf.

"Positioning in Wireless Networks Reference." Downloaded on Jul. 28, 2005 from http://binary.engin.brown.edu/. BINARY Group, Division of Engineering, Brown University, Providence, RI. Available online at http://binary.engin.brown.edu/publication/Positioning_Ref.pdf.

Chirumamilla, Mohan K. and Ramamurthy, Byrav. "Agent Based Intrusion Detection and Response System for Wireless LANs." IEEE Int'l Conference on Communications, 2003, vol. 1, pp. 492-496.

"IBM Research Demonstrates Industry's First Auditing Tool for Wireless Network Security." Jul. 12, 2001, Hawthorne, N.Y. IBM Research News, 'Online. URL: http://domino.research.ibm.com/comm/pr.nsf/pages/news.20010712_wireless.html.

"IBM Researchers Demonstrate Industry's First Self-Diagnostic Wireless Security Monitoring Tool." Jun. 21, 2002, Hawthorne, N.Y. IBM NIEUWS, 'Online! URL: http://domino.research.ibm.com/comm/pr.nsf/pages/news.20020617_dwsa.html.

"Assessing Wireless Security with AiroPeek and AiroPeek NX." A WildPackets Academy Tutorial from www.wildpackets.com, WildPackets Inc., Walnut Creek, CA. URL: http://www.wildpackets.com/elements/whitepapers/AiroPeek_Security.pdf, Apr. 2002.

"AiroPeek and Wireless Security: Identifying and Locating Rogue Access Points." A WildPackets Academy Tutorial from www.wildpackets.com, WildPackets Inc., Walnut Creek, CA. URL: http://www.wildpackets.com/elements/whitepapers/RogueAccessPoints.pdf, 2002.

Craiger, J. P. "802.11, 802.1x, and Wireless Security." Jun. 23, 2002. From the SANS' Information Security Reading Room on www.sans.org, The SANS Institute, Bethesda, MD. URL: http://www.sans.org/rr/papers/68/171.pdf.

Baily, S. "Is IEEE 802.1X Ready for General Deployment?" Apr. 7, 2002. From the SANS' Information Security Reading Room on www.sans.org, The SANS Institute, Bethesda, MD. URL: http://www.sans.org/rr/papers/9/709.pdf.

"Location Determination Papers", List of publications maintained by Moustafa A. Youssef, Department of Computer Science, University of Maryland, College Park, MD 20742. Available online, and downloaded Feb. 9, 2006 at <http://www.cs.umd.edu/~moustafa/location_papers.htm>.

"Positioning in Wireless Networks Reference" Binary Group, Division of Engineering, Brown University, Providence, RI 02912, Available online, and downloaded Feb. 9, 2006 as binary.engin.brown.edu/publication/Positioning_Ref.pdf.

L.M. Ni, Y. Liu, Y.C. Lau and A.P. Patil. "Landmarc: Indoor Location Sensing Using Active RFID." Proceedings of the First IEEE International Conference of Pervasive Computing and Communications 2003 (PerCom '03).

G. Wolfle, R. Wahl, P. Wertz, P. Wildbolz and F. Landstorfer. "Dominant Path Prediction Model for Indoor Scenarios." German Microwave Conference (GeMIC) 2005, Ulm (Germany), Apr. 2005 Paper.

P. Wertz, G. Wolfle, R. Hoppe, D. Zimmermann and F.M. Landstorfer. "Enhanced Localization Technique within Urban and Indoor Environments based on Accurate and Fast Propagation Models." European Wireless, 2002, Florence, Italy.

P. Bahl, V.N. Padmanabhan and A. Balachandran, "A Software System for Locating Mobile Users: Design, Evaluation and Lessons," Microsoft Research Technical Report MSR-TR-2000-12, Feb. 2000.

Steven Fortune, "Algorithms for Prediction of Indoor Radio Propagation,"Proceedings of 48th IEEE Vehicular Technology Conference 98, Jan. 7, 1998. Bell Laboratories, Murray Hill, NJ 07974.

A. Rajkumar, B.F. Naylor, F. Feisullin and L. Rogers, "Predicting RF Coverage in Large Environments using Ray-Beam Tracing and Partitioning Tree Represented Geometry," submitted to the ACM Journal of Wireless Networks after revision on Oct. 12, 1995, AT&T Bell Laboratories, Murray Hill, NJ 07974.

R.A. Valenzuela, S. Fortune, and J. Ling, "Indoor Propagation Prediction Accuracy and Speed Versus Number of Reflections in Image-Based 3-D Ray-Tracing," Vehicular Technology Conference, 1998. Bell Laboratories, Lucent Technologies, Holmdel, NJ 07733.

* cited by examiner

| 2 Bytes | 2 Bytes | 6 Bytes | 6 Bytes | 6 Bytes | 2 Bytes | 0-2312 Bytes | 4 Bytes |
|---|---|---|---|---|---|---|---|
| Frame Control | Duration ID | Addr. 1 | Addr. 2 | Addr. 3 | Sequence Control | Frame Body | FCS |
| 503 | 505 | 507 | 509 | 511 | 513 | 515 | 517 |

| Bytes: | 2 | 2 | 2 | 1 | 1 | Variable |
|---|---|---|---|---|---|---|
| | Number of Pathloss Measurement Burst Cycles | Pathloss Measurement TX Interval | Measurement Duration | Desired Transmit Power | Number of Pathloss Measurement Channels | Pathloss Measurement Channel List |
| | 703 | 705 | 707 | 709 | 711 | 713 |

| Dist. d | $\log_{10}(d)$ | Path loss (dB) |
|---|---|---|
| 205 | 2.31 | 109 |
| 76 | 1.88 | 71 |
| 178 | 2.25 | 103 |
| 172 | 2.23 | 106 |
| 71 | 1.85 | 74 |
| 150 | 2.18 | 85 |
| 134 | 2.13 | 101 |
| 181 | 2.26 | 92 |
| 103 | 2.01 | 91 |
| 89 | 1.95 | 95 |
| 60 | 1.78 | 81 |
| 146 | 2.16 | 104 |
| 172 | 2.24 | 103 |
| 79 | 1.90 | 87 |
| 119 | 2.08 | 90 |
| 184 | 2.26 | 110 |
| 183 | 2.26 | 105 |
| 103 | 2.01 | 88 |
| 75 | 1.87 | 83 |
| 102 | 2.01 | 81 |
| 164 | 2.21 | 101 |
| 73 | 1.86 | 85 |
| 152 | 2.18 | 96 |
| 76 | 1.88 | 76 |
| 66 | 1.82 | 87 |
| 147 | 2.17 | 105 |
| 101 | 2.00 | 96 |
| 209 | 2.32 | 108 |
| 104 | 2.02 | 90 |
| 181 | 2.26 | 110 |
| 149 | 2.17 | 94 |
| 94 | 1.97 | 90 |
| 158 | 2.20 | 96 |
| 91 | 1.96 | 91 |
| 106 | 2.03 | 92 |

FIG 21

TAG LOCATION, CLIENT LOCATION, AND COVERAGE HOLE LOCATION IN A WIRELESS NETWORK

RELATED CASES

This invention claims priority of and is a continuation of U.S. patent application Ser. No. 11/286,086 filed Nov. 22, 2005 now U.S. Pat. No. 7,293,088 to inventors Douglas, et al., titled "TAG LOCATION, CLIENT LOCATION, AND COVERAGE HOLE LOCATION IN A WIRELESS NETWORK,". The contents of U.S. patent application Ser. No. 11/286,086 are incorporated herein by reference.

U.S. patent application Ser. No. 11/286,086 claims priority of U.S. Provisional Patent Application Ser. No. 60/649,721 filed Feb. 3, 2005 to inventors Douglas et al., titled TAG LOCATION, CLIENT LOCATION, AND COVERAGE HOLE LOCATION IN A WIRELESS NETWORK, and assigned to the assignee of the present invention. The contents of U.S. Provisional Patent Application Ser. No. 60/649,721 are incorporated herein by reference.

U.S. patent application Ser. No. 11/286,086 also claims priority of, and is a continuation-in-part of U.S. patent application Ser. No. 10/629,384 filed Jul. 28, 2003, now U.S. Pat. No. 6,990,428, to inventors Kaiser et al., titled RADIOLOCATION USING PATH LOSS DATA, and assigned the the assignee of the present invention. Such U.S. patent application Ser. No. 10/629,384 is referred to herein as the Kaiser et al. invention, and the contents of this application are incorporated herein by reference.

BACKGROUND

The present invention relates to wireless networks, and in particular to a method and system for locating a transmitting radio tag in an infrastructure wireless local area network (WLAN), for locating a client station in the WLAN, and for locating a coverage hole in the WLAN.

It has long been known to use wireless technology to track transmitting radio transmitters. One application of such wireless locating methods is to locate active transmitting devices that are attached to assets. Such transmitting devices are called radio tags, or simply tags herein. The tags often are arranged to transmit a signal optimized for location accuracy. Known tracking methods for such radio tags typically rely on estimating the range from the tag to a plurality of receiving stations at known reference locations. Techniques for performing the range estimation include methods based on estimating the propagation delay, i.e., a time domain technique, or methods based on estimating the path loss from a tag to be tracked to a plurality of receiving stations at known locations.

It has long been known to use wireless technology for packet networks. Packet networks that use wireless links are known as wireless networks. For example, wireless local area networks (wireless LANS, WLANS) based on the IEEE 802.11 standard, commonly known as WiFi, are now becoming ubiquitous.

The present invention relates to using wireless stations of a wireless network for wireless tracking. Furthermore, the present invention relates to such wireless tracking of two types of devices:

1. Radio tags, used herein to mean radio devices that can transmit, and whose main purpose is to be tracked and identified.
2. WLAN clients, used herein to mean devices whose primary purpose is to communicate in an infrastructure WLAN via an access point. The communication can be of transfer voice, video, or data. While the primary purpose of a WLAN client is communication of messages, such devices can also be tracked.

There are many applications for tracking radio tags. Typically, most would involve attaching a radio tag to a high-value asset, e.g., a large component on an assembly line, a medical instrument, or even to children in a large public space.

In one exemplary application, the radio tag is pre-programmed to transmit on a pre-defined channel set, at a pre-specified transmit power, repeating transmission at a pre-defined time interval, and for a pre-defined duration, including, assuming battery operation, until the battery power runs down.

Desirable features of such radio tags include: small size, long lifetime, and long range. There therefore is a desire to make the transmission extremely efficient, e.g., by only transmitting for a relatively short time.

There also are many applications for tracking WLAN clients. Such applications include:

Security: Estimating the location of a wireless client before a decision is made whether or not to authenticate the client.

Safety: Location services such as E911 whereby a person in distress can use a wireless client station to send a message indicating assistance is needed. Location technology would enable emergency personnel to locate the client station quickly.

Network Management and Troubleshooting: A client that is experiencing poor wireless LAN performance requests to be tracked by a management entity, and the location information can help the network operator make a decision that there is either something wrong with the network, or something wrong with the client device. The operator could also use locating tracking capability to examine when and where the network gets overloaded with voice or data devices.

One desirable feature of radio tags is infrequent recharging or battery replacement. Thus, a typical tag may require recharging or battery replacement once every few years. Typical wireless LAN clients get recharged once every few hours. Therefore, in the case of client locating, power efficiency is not as much of a concern as with radio tags. Flexibility is much more important. It is desirable for wireless clients to have their channel sets, transmit power, transmit interval, and transmit durations adjusted as the need arises. It is also desirable to enable existing "legacy" clients to be easily upgraded for location capability, e.g., using software modifications only rather than having to replace hardware components.

There is thus a need in the art for a unified location method and system that includes one or more of these desirable aspects, e.g., that can use substantially standard WLAN infrastructure, and thus that can be widely deployed quickly.

There is also a need in the art for a unified location method and system that provides for interoperability among vendors. For example, there is a need in the art for a single location method and system that can locate tags and client devices manufactured by multiple different companies.

A number of techniques have been proposed for radiolocation. Methods are known, for example, that rely on the Global Positioning System (GPS). GPS, however, is known to have poor indoor reception and long acquisition time. GPS also requires additional GPS hardware in the wireless station that would increase the cost of stations, e.g., client devices.

Methods also are known for radiolocation that rely on time difference of arrival (TDOA) estimation. Such methods require relatively precise time synchronization at each station.

Methods also are known for radiolocation in a WLAN that use signal strength measurements, e.g., RSSI measurements using existing mobile client station hardware. Some such methods use training to form a map of propagation characteristics that in turn requires taking time-consuming signal strength measurements at numerous locations by a cooperative mobile client station. Examples of methods that use training include that described in Small, J., Smailagic, A., and Siewiorek, D. P. (2000): "Determining User Location For Context Aware Computing Through the Use of a Wireless LAN Infrastructure," Pittsburgh, USA: Institute for Complex Engineered Systems. Carnegie-Mellon University, Pittsburgh, Pa. 15213, 2000. Available at http://www-2.cs.cmu.edu/~aura/docdir/small00.pdf. Another such method is that described in P. Bahl and V. N. Padmanabhan, RADAR: "An In-Building RF-based User Location and Tracking System," IEEE Infocom 2000, vol. 2, March 2000, pp. 775-784. Yet another is described in Kishan, A., Michael, M., Rihan, S., and R. Biswas: "Halibut: An Infrastructure for Wireless LAN Location-Based Services," Technical paper for Course CS444n, Computer Science Department, Stanford University, Stanford Calif., June 2001. Previously available at http://fern2.stanford.edu/cs444n/paper.pdf.

A prior art method also is known for WLANs that uses RF modeling. The modeling, however, requires detailed input of building layout, wall location, and construction materials. Some of the papers and technical reports mentioned in the previous paragraph include such models.

U.S. Pat. Ser. No. 6,664,925 issued Dec. 16, 2003 to Moore et al. and titled APPARATUS AND METHOD FOR MAPPING A LOCATION OF WIRELESS BASE STATIONS IN A MOBILE COMMUNICATION SYSTEM uses RSSI measured at client stations from APs at known regions to determine which of the regions the client station is at, e.g., which AP location is the closest. A variation is mentioned which uses the inverse square propagation model to also attempt to describe how close to the nearest AP the client may be. The Moore et al. method provides relatively coarse measures and requires the location of the APs to be known in advance. Furthermore, the Moore et al. method is described for client stations only and not as a unified method suitable for tag location, WLAN coverage area gap determining, and client station location. Furthermore, the Moore et al. method does not include any field calibration to correct AP measurements by using AP to AP path loss measurement.

Above referenced Kaiser et al. invention (U.S. patent application Ser. No. 10/629,384, incorporated herein by reference) described a method of locating an unknown client station or a rogue client station. One embodiment of the Kaiser et al. invention operates in a managed wireless network in which the APs and their clients are managed by a central management entity. The managed wireless network substantially conforms to the IEEE 802.11 standard in that the network is compatible with that standard, and includes slight modifications, such as additional MAC frames that are used to convey information such as transmit power. Furthermore, stations of the network measure the received signal strength relatively accurately. By a managed access point is meant an access points at a known location whose transmit power is known and whose received signal strength is measurable.

An implementation of the Kaiser et al. method includes accepting an ideal path loss model and calibrating the ideal path loss model using path loss measurements between a first set and a second set of managed access points of a managed wireless network in an area of interest. The stations of the first and second sets are at known locations. In one embodiment, the first and second sets are the same set of managed access points of the managed wireless network located in the area of interest. The path loss measurements are obtained using measurements received from the first set that measure the received signal strengths at each of the respective APs of the first set as a result of transmissions by each wireless station of the second set. Each transmission by a respective station of the second set is at a known respective transmit power. The method further includes measuring the path loss between the wireless station of an unknown location and at least some of the managed access points. The calibrating determines a calibrated path loss model between the access points. Such a calibrated model is then used to locate a client station. The client may be a managed client of one of the managed access points transmitting at a transmit power whose value can be determined at the receiving AP, or a rogue station transmitting at an unknown power.

Known methods of radiolocation using signal strength measurements may be unsuitable for tag location because of the requirements for tags to have long battery life and automated operation.

There thus still is a need in the art for a unified method to track radio tags and client stations, and to determine gaps in coverage area. There further is a need in the art for a unified tag location, client location, and coverage gap location method that do not need a map or require field calibration measurements in order to provide a location estimate. There further is a need for a method that does not require but can use AP-to-AP field calibration measurements to improve performance.

SUMMARY

One aspect of the invention is providing a common infrastructure for radio tags and client stations of a WLAN to be located using radiolocation by path loss measurement. Another aspect of the invention is defining a mechanism for radio tags to transmit information with relatively low power consumption compared to transmitting normal payload carrying frames. A frame format is defined that according to one embodiment of the invention provides an extremely efficient method for conveying all the information needed to locate radio tags and clients using path loss measurements.

Another aspect of the invention provides for interoperability of tags and clients from various vendors. By using the frame format defined herein, any radio tag or client may be efficiently located. For example, in one application, radio tags from a first company, and client stations made by a second company, may be located by a location server made by the second, or by an unrelated third company.

BRIEF DESCRIPTION OF THE DRAWINGS

FIG. 5 shows the structure of a PSDU: physical layer convergence protocol (PLCP) service data unit (SDU) that is transmitted by a conforming radio tag or client according to an aspect of the invention.

FIG. 7 shows the structure of one embodiment of a transmit request frame sent to a conforming client station by an access point requesting measurement, e.g., for location determination according to an aspect of the invention.

FIG. 21 shows a table of the distance, denoted d, (in feet) between each pair of access points of the set shown in FIG. 16, the $\log_{10}$ of the distance d, and the path loss in dB between the pairs of access points where a link exists, for an experiment performed using 802.11b APs.

FIG. 23 shows four walk-through paths used in the experiment.

DETAILED DESCRIPTION

Figure 1:
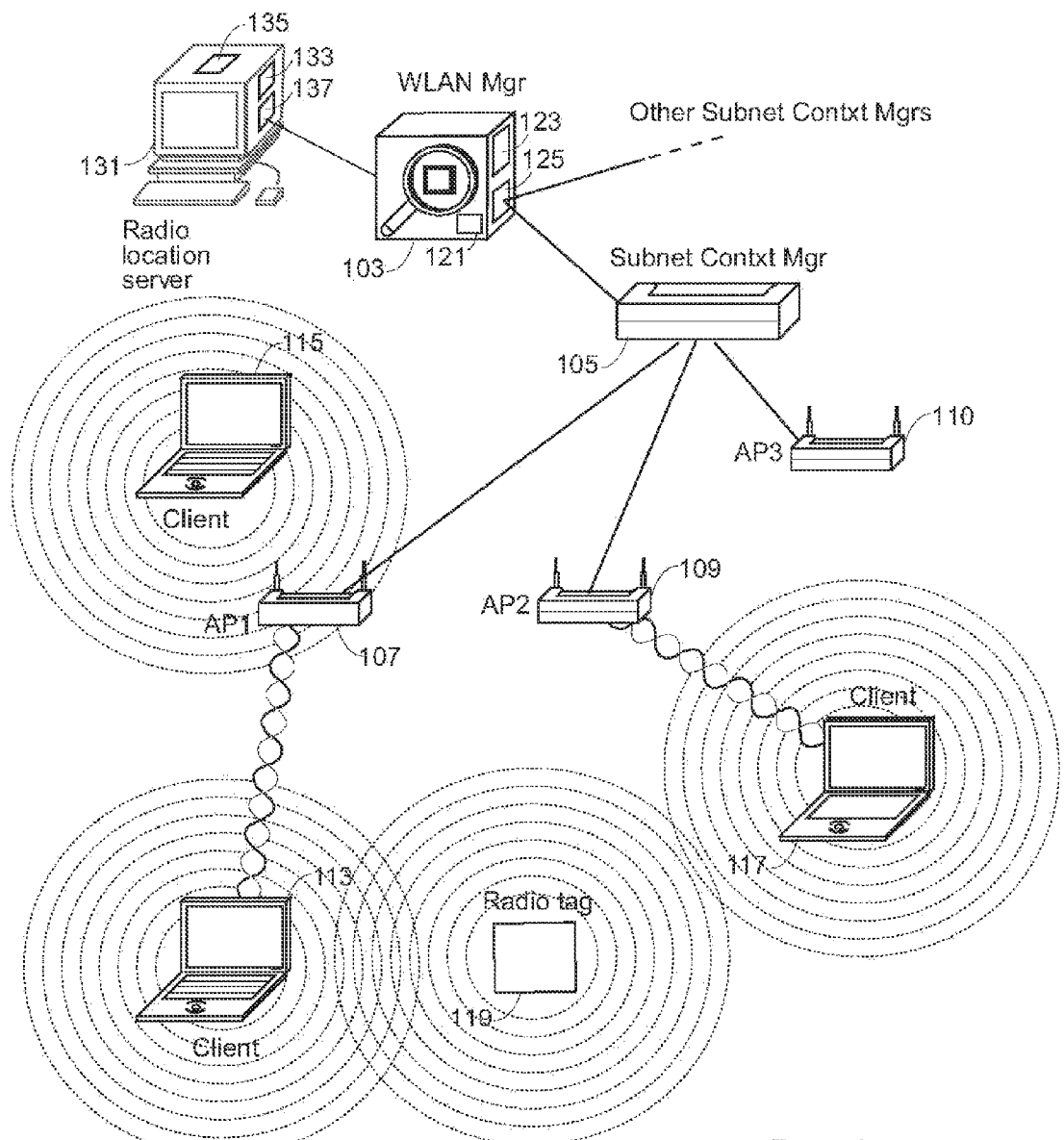
FIG. 1 shows one example of a network in which the present invention operates, including a management entity called the WLAN manager.

One embodiment of the present invention is a method of determining the likely location or locations of a radio tag or client station, or determining the location of a gap (also called a hole) in WLAN coverage.

One aspect of the invention includes defining a common frame having pre-defined frame structure to be used by transmitting radio tags and by client stations transmitting to a pre-assigned multicast address. Such a frame is called a location frame, and also a path loss measurement frame herein. In the remainder of the description, it is assumed that the to-be-located radio tags and the client stations are "conforming" in that they transmit such a location frame. It is also assumed that access points also are "conforming" in that they listen at the pre-defined multicast address, and understand the pre-defined frame structure of a location frame. In one embodiment, the conforming APs are assumed to be managed APs in a managed WLAN as described in above-mentioned and incorporated by reference U.S. patent application Ser. No. 10/629,384 (the Kaiser et al. Invention). Note that in the present invention it is sufficient that the APs be conforming in that the APs listen for the location frame.

Thus one embodiment of the invention operates in a managed wireless network in which the APs and their clients are managed by a central management entity. One embodiment of the managed wireless network substantially conforms to the IEEE 802.11 standard. By substantially conforming we mean compatible with. Some aspects of the IEEE 802.11 standard are modified slightly to accommodate some management aspects used in the invention. In particular, for some aspects of the invention, additional MAC frames are assumed, including a location frame. Furthermore, stations of the network measure the received signal strength relatively accurately. The APs are assumed not only to be managed access points, but also at known locations, transmitting at known transmit powers when transmitting, and able to obtain a relatively accurate measure of the received signal strength (called received signal strength indication, or RSSI herein).

Managed Networks

Depending on the size and complexity, a managed network is either a set of APs with a central control entity, or a hierarchical structure with a set of hierarchical control domains that eventually are coupled to a set of APs. Each control domain is managed by a management entity we call a manager herein. The number of levels in the hierarchy depends on the complexity and/or size of the network, and thus not all managed networks have all levels of control. For example, a simple managed network may only have one level of control with a single management entity controlling all the APs. Factors that influence the selection of control domains include one or more of: the various types of IP subnet configurations; the radio proximity of the access points; the client station roaming patterns; the real time roaming requirements; and the physical constraints of the network (e.g. campus, building, and so forth).

In this description, we assume a single management entity we call the WLAN Manager. Management entities we call Subnet Context Managers may be included, each controlling some aspects of a single subnet or virtual local area network (VLAN). A Subnet Context Manager, for example, may relay instructions from the WLAN manager to all managed APs in its subset or VLAN. In some embodiments, the functions of the subnet context manager are carried out at a higher level, e.g., at the same level as the WLAN Manager. Other embodiments may have a different number of levels in the hierarchy with different levels of management. For example, in some embodiments, the functions of the subnet context manager are carried out at a higher level, e.g., at the same level as the WLAN Manager. For more information on radio management, see U.S. patent application Ser. No. 10/766,174 file Jan. 28, 2004 to inventors Olson, et al., titled A METHOD, APPARATUS, AND SOFTWARE PRODUCT FOR DETECTING ROGUE ACCESS POINTS IN A WIRELESS NETWORK, assigned to the assignee of the present invention, and incorporated herein by reference.

The WLAN Manager manages several aspects of the wireless network, e.g., security, and in one embodiment, authorizes a set of access points in the network—we call these the managed access points—including maintaining a database called the Configuration Database that contains configuration parameters. The Configuration Database also includes an AP database that includes information on the managed APs, e.g., a list of the managed APs together with some data related to these APs, such as the location of the APs and the power the APs are set to transmit at. A single WLAN Manager is typically deployed to handle all the wireless clients within the enterprise campus. The WLAN Manager provides centralized control of various aspects of the radio environment within a given set of APs, including the measurement aspects of the present invention and the radiolocation aspects of the present invention. The WLAN Manager provides the ability to determine network wide radio parameters during initial network deployment and network expansion. In one embodiment, the WLAN Manager selects certain radio parameter values to provide an adequate radio environment. In one embodiment, the WLAN Manager further centrally coordinates all client and AP measurements.

Thus, aspects of the invention are implemented on the WLAN Manager and use measurements made under control of the WLAN manager. However, the invention does not require there to be a single WLAN Manager entity. The functionality described herein may be incorporated into any of other management entities, e.g., at a local level, or by a separate manager called the Radio Manager that controls the radio aspects of the WLAN. Furthermore, any of these management entities may be combined with other functionalities, e.g., switching, routing, and so forth.

A simple managed network is shown in FIG. 1. All managers are assumed incorporated into a single management entity—the WLAN Manager—that has access to the AP Database. It is to be understood that the WLAN Manager incorporates the functions of the Radio Manager.

FIG. 1 shows a WLAN manager 103 that includes a processing system 123 with one or more processors and a memory 121. The memory 121 includes instructions that cause one or more processors of the processing system 123 to implement WLAN Management aspects that are implemented in the WLAN Manager. The WLAN manager 103 includes a network interface 125 for coupling to a network, typically wired. In one embodiment, the WLAN manager is part of a network switch and operated under a network operating system, in this case IOS (Cisco Systems, Inc., San Jose, Calif.).

The WLAN Manager 103 is coupled via its network interface 125 and a network (typically a wired network) to a set of Subnet Context Managers. One such Subnet Context Manager is shown as element 105 in FIG. 1. All managed APs in a subnet register with a Subnet Context Manager. For example, in FIG. 1, three APs named AP1, AP2, and AP3 (107, 109, and 110, respectively) each are part of the same subnet and have a network connection to Subnet Context Manager 105. Any management communication between the WLAN Manager 103 and APs 107, 109 and 110 is then via the Subnet Context Manager 105.

A radio-location server 131—also simply called a location server—is coupled to the network. The location server 131 includes a processing system 133 with one or more processors and a memory 135. The memory 135 includes instructions that cause one or more processors of the processing system 133 to implement location determining of the present invention that is implemented in the location server 131. The location server 131 includes a network interface 137 for coupling to a network, typically wired. In the implementation shown here, the location server 131 is coupled to the WLAN manager 103 and managed therefrom. In alternate implementations, the location server 131 is completely independent of the WLAN manager 103. For example, there may be no WLAN manager present. In yet another embodiment, the location server is implemented in the same hardware as the WLAN manager 103, such that the network interface 137 is part of network interface 125, the memory 135 is in memory 121, and the processing system 133 is part or all of the one or more processors of processing system 123. In yet another implementation, the location server 131 is part of the subnet context manager 105.

A client station may associate with an AP. Thus, in FIG. 1, APs 107 and 109 each are shown with associated clients 113, and 117, respectively. By a managed client we mean a client that associates with a managed AP. Thus, clients 113, 115, and 117 are managed clients. In this description, managed clients are also conforming clients.

Also shown is a tag 119. A simple tag will not associate with an AP, and the location method described herein does not require such association. More complex tags have the capability to associate and communicate with APs much like conventional clients do today. Either case is covered by the protocols described herein.

Note that while two of the clients are shown in association with respective APs, all "conforming" clients 113, 115, and 117, and a conforming radio tag such as tag 119 are, according to aspects of the present invention, designed to periodically wirelessly transmit location information (location frames) as unidirectional broadcasts. These broadcasts are shown as concentric rings in FIG. 1.

The Wireless Stations and Tags

A wireless network uses management frames at the MAC layer designed, sent, and received for management purposes. For example, in a WLAN that conforms to the IEEE 802.11 standard, an AP regularly transmits beacon frames that announce the AP's presence, i.e., advertises the AP's services to potential clients so that a client may associate with the AP. Similarly, a client can send a probe request frame requesting any AP in its radio range to respond with a probe response frame that, in a similar manner to a beacon frame, provides information for the requesting client (and any other radios in its radio range and able to receive its channel) sufficient for a client to decide whether or not to associate with the AP.

Figure 2:
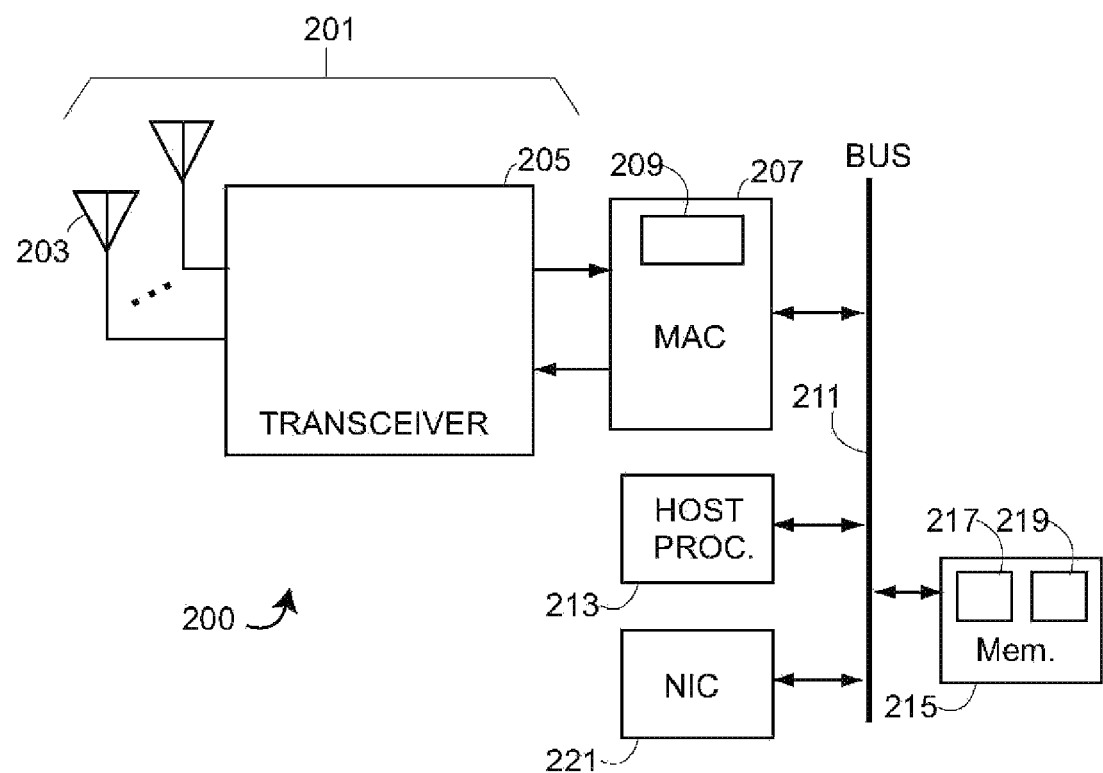
FIG. 2 shows a simple block diagram of one embodiment of a wireless station that may be an AP or a client station and that implements one or more aspects of the invention.

FIG. 2 shows one embodiment of a wireless station 200 that may be an AP or a client station and that implements one or more aspects of the present invention. While a wireless station such as station 200 is generally prior art, a wireless station that includes aspects of the present invention, e.g., in the form of software, is not necessarily prior art. The radio part 201 includes one or more antennas 203 that are coupled to a radio transceiver 205 including an analog RF part and a digital modem. The radio part thus implements the physical layer (the PHY). The digital modem of PHY 201 is coupled to a MAC processor 207 that implements the MAC processing of the station. The MAC processor 207 is connected via one or more busses, shown symbolically as a single bus subsystem 211, to a host processor 213. The host processor includes a memory subsystem, e.g., RAM and/or ROM connected to the host bus, shown here as part of bus subsystem 211. Station 200 includes an interface 221 to a wired network.

In one embodiment, the MAC processing, e.g., the IEEE 802.11 MAC protocol is implemented totally at the MAC processor 207. The Processor 207 includes a memory 209 that stores the instructions for the MAC processor 207 to implement the MAC processing, and in one embodiment, some or all of the additional processing used by the present invention. The memory is typically but not necessarily a ROM and the software is typically in the form of firmware.

The MAC processor is controlled by the host processor 213. In one embodiment, some of the MAC processing is implemented at the MAC processor 207, and some is implemented at the host. In such a case, the instructions (the code) for the host 213 to implement the host-implemented MAC processing are stored in the memory 215. In one embodiment, some or all of the additional processing used by the present invention is also implemented by the host. These instructions are shown as part 217 of memory.

Figure 3:
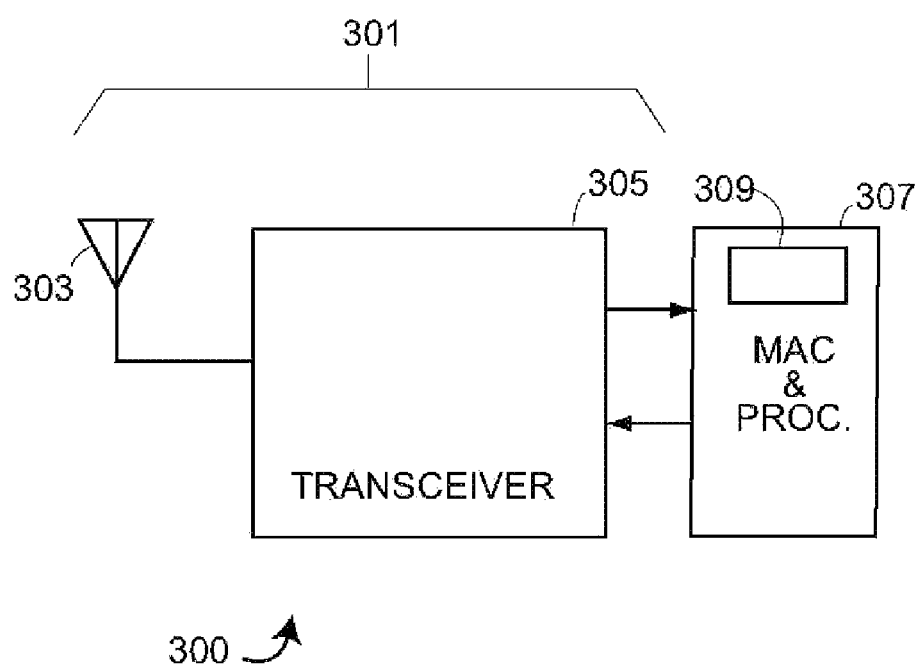
FIG. 3 shows one embodiment of a conforming radio tag that implements one or more aspects of the invention.

FIG. 3 shows one embodiment of a conforming tag that implements one or more aspects of the invention. While a radio tag such as tag 300 may be generally prior art, a tag that includes aspects of the present invention, e.g., in the form of software, is not necessarily prior art. The radio part 301 includes at least one antenna 303 that are coupled to a radio transmitter 305 including an analog RF part and a digital modulator. In one embodiment, an element 305 is a transceiver that includes a radio receiver and a digital demodulator. The transmitter part of the radio transmits packets that conform to one or more variants of the physical layer (the PHY) of the IEEE 802.11 standard. The digital modulator of the radio part 301 is coupled to a MAC processor 307 that generates the MAC frames and other MAC processing aspects of the radio tag 300. In one version, the MAC processor includes a memory 309 that stores the instructions for the MAC processor 307 to implement the MAC processing, including the transmitting and forming of the MAC frames used for the location determining, as described herein. The memory is typically but not necessarily a ROM and the software is typically in the form of firmware.

In a preferred embodiment, the radio tag further includes a receiver, such that the radio part includes a radio transceiver and a modem rather than only a transmitter and modulator. Furthermore, the MAC processor is also able to receive MAC frames such that transmissions of radiolocation frames only occur when there is a clear channel. Thus, in one embodiment, the radio tag is arranged to listen for a clear channel before it begins transmission, and uses a backoff mechanism similar to that specified in the IEEE 802.11 specification.

Note that while the station of FIG. 2 may be used as a radio tag, a radio tag such as shown in FIG. 3 typically is a simpler device that has less capability than a wireless station such as the station shown in FIG. 2.

According to one aspect of the invention, a tag or conforming client is programmed to periodically transmit on a single channel, or periodically transmit on a number of channels in rapid succession to a pre-assigned multicast address. One aspect of the invention is that the radio tag or client does not need to associate to, or be associated to an AP, e.g., a conforming AP in order to transmit a radiolocation frame. In one embodiment, when the tag cycles through a number of channels in rapid succession, the tag will use the same sequence number for the transmission on each channel of the cycle.

Aspects of the invention are intended for operation under a set of specifications that specify some extensions to the IEEE 802.11 specifications that deal with the ability of client stations to transmit at a transmit power that is known and is accurate to within a pre-defined level of accuracy. One such set of extensions is known as the Cisco Compatible Extensions For WLAN Devices ("CCX"), by Cisco Systems, Inc., of San Jose, Calif. Under CCX, a client has to be able to transmit with a transmit power accuracy of ±3 dB. By a "compliant client" is meant a client that conforms to extensions of the IEEE standard in several ways, including, for the purpose of the present invention, by so providing transmit power accuracy. Similarly, by a compliant radio tag is meant a radio tag that conforms to a set of specifications, including transmitting at a known transmit power to within a pre-defined level of accuracy.

Aspects of present invention are intended to operate with radio compliant radio tags and with compliant client stations, within a managed WLAN. Furthermore, each managed AP in the WLAN has a radio receiver that provides a received signal strength indication signal that has been calibrated such that a relatively accurate measure of the received signal strength (RSSI) is available. For example, Cisco brand radio receivers used in Cisco brand access points (Cisco Systems, Inc., San Jose, Calif.) undergo a rigorous calibration process such that the RSSI measure provided by the radio receivers are relatively accurate over time and temperature.

Simplified Configurations

Figure 4A:
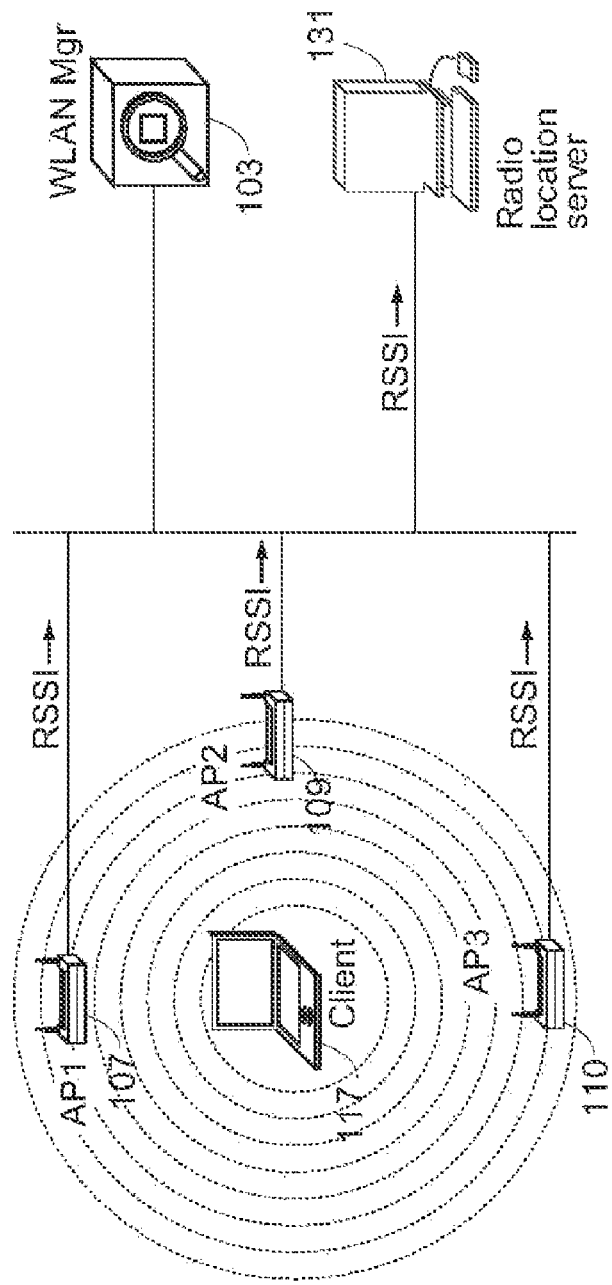
FIG. 4A shows a simplified arrangement of three access points in communication with a separate location server. A conforming client is shown transmitting location based presence packets (location frames) to an assigned multicast address according to aspects of the invention.

FIG. 4A shows a simplified arrangement of AP1 107, AP2 109, and AP3 110 in communication with a separate location server 131. A conforming client 117 is shown sending location based presence packets (location frames) to an assigned multicast address. The conforming APs 107, 109 and 110 listen at the pre-assigned address.

Figure 4B:
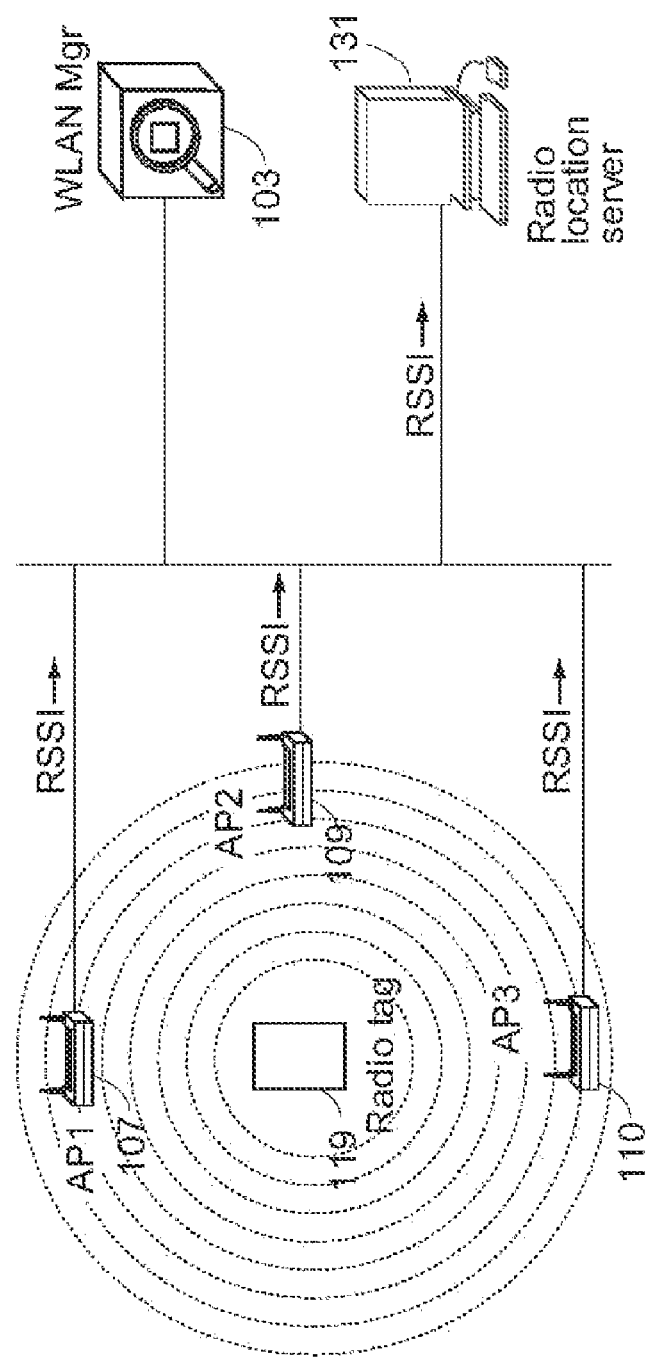
FIG. 4B shows a simplified arrangement of three access points in communication with a separate location server. A conforming radio tag is shown transmitting location based presence packets (location frames) to an assigned multicast address according to aspects of the invention.

FIG. 4B shows a similar simplified arrangement to that of FIG. 4A, with AP1 107, AP2 109, and AP3 110 in communication with a separate location server 131. A conforming radio tag 119 is shown sending location based presence packets (location frames) to an assigned multicast address. The conforming APs 107, 109 and 110 listen at the pre-assigned address.

One embodiment of the radiolocation determination uses a path loss measurement technique. The preferred method does not need a map or field calibration measurements in order to provide a location estimate. While field calibration is not necessary, if field calibration measurements are present, this technique can take advantage of such measurements to learn about the propagation environment to achieve improved performance.

One aspect of the invention is that the same method is used for tracking the location of transmitting radio tags, tracking the location of transmitting client stations, and locating holes in the coverage area in a WLAN that includes a plurality of APs. Another aspect of the invention is the use of a simple, short location frame structure for all location-based applications. Using such a short common frame structure provides for low power consumption compared to transmitting normal payload carrying frames, which may be important, e.g., for radio tags. Conforming APs understand this frame structure.

One aspect of the invention is that location frames transmitted from conforming radio tags or client stations conform to a pre-defined frame structure understood by a conforming AP. In one embodiment, the packets from a conforming radio tag or client station is a packet that substantially conforms to the IEEE 802.11 standard data packet types. FIG. 5 shows the structure 500 of a PSDU: physical layer convergence protocol (PLCP) service data unit (SDU) that is so transmitted. The structure 500 shows the different fields in the PSDU, and their respective lengths. The fields are as follows:

The Frame Control field 503 of length 2 bytes is the 802.11 Frame Control word. For conforming radio tags or client stations, in one embodiment, the fields are set as follows:

Protocol version=00
Type=10 (data)
Subtype=0000 (data)
To DS=1 (to infrastructure)
From DS=0 (from client station)
All other frame control bits are set to zero.

The Duration ID field 505 is set according to the published IEEE 802.11 standard, published in 1999, and reaffirmed in 2003. See IEEE 802.11, 1999 Edition (ISO/IEC 8802-11: 1999) "IEEE Standards for Information Technology—Telecommunications and Information Exchange between Systems—Local and Metropolitan Area Network—Specific Requirements—Part 11: Wireless LAN Medium Access Control (MAC) and Physical Layer (PHY) Specifications." Available from the IEEE at http://standards.ieee.org/getieee802/802.11.html.

The Address 1 field 507 of length 6 bytes is set with a predefined location based services Multicast Address. In one embodiment, this address is 01:40:96:00:00:10. This predefined location based services Multicast address is used by a conforming access point receiving such a frame to identify this received frame as a radiolocation frame and process accordingly. Thus one aspect of the invention is that the frame includes an identifier, in the form of a multicast address, that provides for a receiving station to recognize the frame as a frame that includes location based service information.

The Address 2 field 509 of length 6 bytes is a unique identifier—the source address—for a conforming tag device or conforming client station.

The Address 3 field 511 of length 6 bytes is for use by different vendors. In one embodiment, a conforming AP forwards this address field to the location server 131. It is anticipated that different vendors will use this address field 511 for different purposes.

The Sequence Control field 513 of length 2 bytes is set according to the published IEEE 802.11 standard.

The FCS (frame check sequence) field 517 of length 4 bytes provides 32 bits to check that the data sent was valid.

Figure 6A:
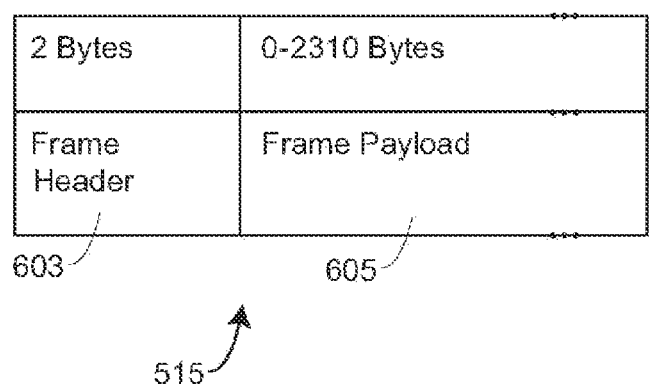
FIG. 6A shows the overall structure of the frame body field in the PSDU shown in FIG. 5 for a location frame according to an embodiment of the invention.

The frame body field 515 is a field that is between 2-bytes and 2312 bytes long, and is according to one embodiment, where the location information is contained. FIG. 6A shows the overall structure of the frame body field 515. The first two bytes of the frame body is a two-byte field 603 called location information word, and also called the frame body header, that includes basic information used for location determination. The remainder of the frame body, the frame payload 605 of length up to 2310 bytes is optionally used to include transmit proprietary information from the radio tag or conforming client to the location server 131. In one embodiment, the frame body 515 includes only the location information word 603.

Figure 6B:
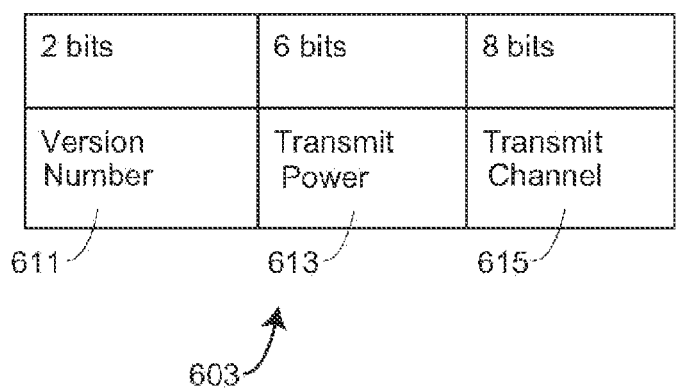
FIG. 6B shows the location information word in the frame body field of FIG. 6A according to an embodiment of the invention.

FIG. 6B shows the location information word 603. The first 2 bits is called the Version Number and defines the format of the location information word. This provides for alternate formats. The inventors call the format described herein as that defined by Version Number 611 of value zero.

In the embodiment defined by version number 0, the next 6 bits of the location information word 603 is a field 613 for the transmit power. This field is set by the conforming tag or conforming client to the transmit power level used in the transmitting by the conforming radio tag or client station. In one embodiment, this value is in dBm using 2's complement integers defining the range: −32 through +31 dBm.

In the embodiment defined by version number 0, the final 8 bits of the location information word 603 is a field 615 called the Channel Number field, which is set to the channel number used by the conforming radio tag or client station when transmitting the frame. This field uses the same definition as dot11CurrentChannelNumber MIB parameter in the published IEEE 802.11 standard (1999 version reaffirmed in 2003).

Scheduling Measurements by APs

Each conforming radio tag or client station is set up to transmit the location frames according to a pre-defined schedule. A number of parameters are used to set up the way a conforming tag or client station transmits the location frame. In one embodiment, the radio tag or station is arranged to send transmission of a number of bursts of frames in a predefined schedule on predefined radio channels. Each burst includes at least one cycle of transmitting one or more frames. The bursts of cycles of transmissions are repeated according to a pre-defined schedule.

In one embodiment, several parameters are used to define the way a conforming client or radio tag transmits the location frames. One embodiment includes a two-byte number called Number of Path loss Measurement Burst Cycles to indicate to the client or radio tag how many times to transmit a number of location frames in each burst. A value of zero is used indicate that the radio tag or conforming client station should continually transmit bursts of location frames.

A 2-byte number called the burst interval is used to provide the conforming tag or client station with an interval—in one embodiment a number of seconds—between each subsequent transmission of the cycles(s) of bursts of location frames.

A one-byte number is used to provide the conforming tag or client with the preferred transmit power (in dBm) for the location frames in the bursts. Another one-byte long number called the Number of location frame channels is used to indicate to the conforming tag or client station the total number of channels included in a single burst. A related set of one or more numbers, called the channel list provides the conforming tag or client station with a list of channels. The list includes a channel number, e.g., as a single byte, for each of the number of channels per burst. For example, if the same channel is used more than once in a single cycle, than that channel number appears a corresponding number of times in the channel list.

In one embodiment, the radio tag or conforming client is provided with a mechanism for setting these parameters. One method provides a wired mechanism for a radio tag to receive the information. Another method is wirelessly setting these parameters. Another aspect of the invention is such a method for wirelessly setting the parameters. One embodiment uses a measurement protocol. The case of setting up conforming client stations is discussed in more detail. How to set up conforming radio tags would be clear from the discussion of conforming clients.

For the case of conforming clients in a managed network, one embodiment uses a protocol we call the WLAN Manager-to-AP Measurement Protocol. According to this protocol, the WLAN Manager 103 or location server 131 (see FIG. 1) can send a message, we call a Measurement Request Message, to, and receives report messages, we call Measurement Report Messages, from one or more managed APs, either directly, or via one or more Subnet Context Managers. The messages can be encapsulated in Ethernet frames or UDP/TCP/IP packets. In one embodiment, Ethernet is used between a Subnet Context Manager and an AP, while IP encapsulation is used for inter-subnet messages.

In the case of conforming clients, the AP receiving the Measurement Request Message schedules the actual transmissions in conforming clients. In the case of conforming radio tags, different wireless stations can be used to schedule radio tag schedules.

One aspect of the invention is that the Measurement Request Message includes a schedule for one or more conforming clients to transmit frames for the purpose of location determining. In such a case, the AP translates the Measurement Request Message into a path loss frame transmit request for each such conforming client station. In one embodiment, the measurement communication between the APs and clients uses MAC frames that conform to a modification of the IEEE 802.11 standard MAC protocol we call the AP-to-client Measurement MAC Protocol herein. The AP-to-client Measurement MAC Protocol includes IEEE 802.11 standard frames, some of which are modified to include additional information that may be used by one or more embodiments of the invention. Any standard type MAC frames that conform to the AP-to-client Measurement MAC Protocol include an indication of such conformity. For example, an association request frame includes an element that indicates whether or not the station supports radio management including the ability to carry out and report the client measurements described herein. A beacon frame and a probe frame that conform to the AP-to-client Measurement MAC Protocol may include the transmit power of the AP transmitting the frame.

A frame we call the Transmit Request Frame is transmitted by an AP to request a sequence of one or more transmissions by a client at a scheduled time with a report at a scheduled reporting time. A receiving client station attempts to send a burst of at least one location frames in response to a Transmit Request Frame. We call such a burst a path loss measurement burst. While one embodiment uses the location frame structure described above and in FIGS. 5, 6A and 6B in the burst, another embodiment uses a different frame structure easier to implement in common MAC processors used in existing client stations. Such a location frame includes the MAC address of the station providing the report, and one or more measurement elements.

Measurements—Storing Beacons, Probe Responses, and Received Location Frames

According to one aspect of the invention, each AP can also listen for beacons and probe responses from other APs. Therefore, a station such as station 200 (in FIG. 2) maintains a database of the beacons and probe responses it receives, called a beacon database. Beacons and probe responses are stored in the database under one or more circumstances, e.g., when the station determines whether or not to associate with an AP, or upon request, e.g., from the WLAN manager to listen for beacons and probe responses on its serving channel (what we call a passive scan), or upon request, e.g., from the WLAN manager to temporarily mode to another channel and listen for beacons and probe responses after sending a probe request (what we call an active scan). In the context of aspects of the present invention, beacons and probe responses received at the station are stored in the beacon database. We call this database the Beacon Table. As shown in FIG. 2, in one embodiment, the Beacon Table 219 is in the memory 215 of the station. Other embodiments store the Beacon Table 219 outside of memory 215. A station stores the information in the beacons and probe responses in its Beacon Table 219, and further stores additional information about the state of the station when it receives the beacon.

The information stored in the beacon database 219 includes the information in the beacon/probe response, and, according to one embodiment of the invention, the RSSI detected at the PHY of the receiver of the beacon/probe response.

The aspects of stored beacons is used in the AP-to-AP measurements used in calibrating for actual AP-to-AP measurements, as described herein under.

The components of radio management include radio measurement in managed APs and their clients. One embodiment uses the 802.11h proposal that modifies the MAC protocol by adding transmission power control (TPC) and dynamic frequency selection (DFS). TPC limits the transmitted power to the minimum needed to reach the furthest user. DFS selects the radio channel at an AP to minimize interference with other systems, e.g., radar.

Another embodiment uses a protocol that differs from the presently proposed 802.11 protocol by providing for tasking at the AP and, in turn, at a client to autonomously make radio measurements according to a schedule. In one embodiment, the information reported includes, for each detected AP, information about the detection, and information about or obtained from contents of the beacon/probe response.

In yet another embodiment, a transmit request frame 700 (in FIG. 7) as described above is used to task a conforming radio tag or a client station.

FIG. 7 shows the structure of one embodiment of transmit request frame 700 sent to a conforming client station by an AP requesting measurement, e.g., for location determination. A two-byte field 703 called Number of Path loss Measurement Burst Cycles is used to indicate to the client how many cycles of location frames (Path loss Measurement frames) the receiving client should transmit in a burst, where a cycle includes at least one location frame. A value of zero in field 703 is used indicate that the receiving client station should continue transmitting bursts of Path loss Measurement frames until the Path loss Measurement Request is cancelled.

A 2-byte field 705 called the Path loss Measurement Transmit Interval field is used to provide the receiving client station with an interval—in one embodiment a number of seconds—between each subsequent burst of the at least one cycle of Path loss Measurement frames, the number of cycles indicated in field 703. Therefore, if field 703 is 2 and field 705 is 4, a burst of two cycles of at least one frame is transmitted every 4 seconds.

A 2-byte field 707 called the Measurement Duration field provides the receiving client station with the duration of the requested measurement, expressed in time units (TUs), each TU being 1024 µs according to the IEEE 802.11 standard. Once the client station receives the frame 700, the client station is expected to go off-channel and transmit a Path loss Measurement burst. If the client station is unable to transmit using standard 802.11 Media Access Protocols before the amount of time indicated in the Measurement Duration field 707, in one embodiment, the client station returns to the serving channel without transmitting the Path loss Measurement burst of frames.

A one-byte field 709 called Desired Transmit Power is used to define to the receiving client station the preferred transmit power (in dBm) for the location frames in the path loss measurement bursts. Note that the actual transmit power used depends on the client station.

Another one-byte long field 711 called the Number of Path loss Measurement Channels field is used to indicate to the receiving client station the total number of channels included in a single cycle in the burst of location frame transmissions. This number indicates the number of frames per cycle. A related field 713 called the Path loss Measurement Channel List field is used to provide the client station with a number of bytes of channel information, each byte indicating a single channel to use in the transmitting. Therefore, the length of field 713 depends on the number of channels.

Alternate Frame Structure

The common location frame structure described above and in FIGS. 5, 6A, and 6B is selected to be relatively short, so that, for example, radio tags can transmit the frames with minimum transmit power to preserve battery life. Furthermore, while in one embodiment the same structure is used by conforming radio tags and clients, in an alternate embodiment, yet another frame structure is used for some clients. The inventors have found, for example, that many WLAN hardware manufacturers use a hardware MAC processor that restricts the type of frames used. Thus, in an alternate embodiment, a location frame is used that more closely conforms to a standard MAC frame.

Figure 8:
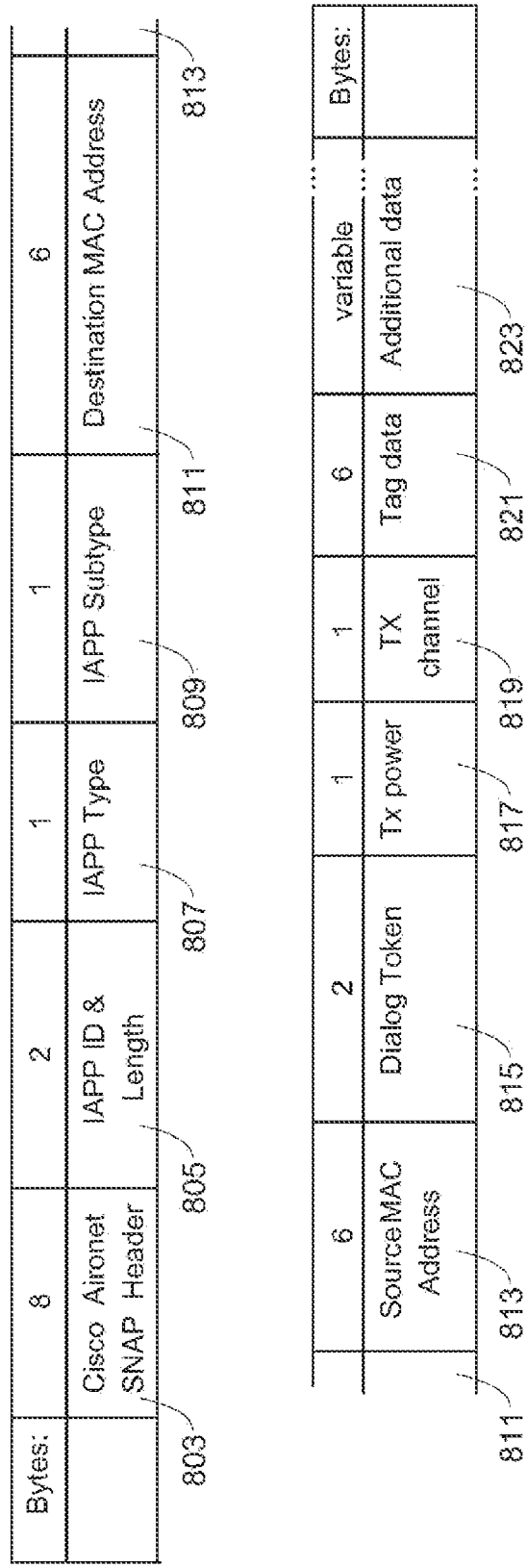
FIG. 8 shows an alternate structure of a location frame for use by a client station for location determining according to an aspect of the invention.

FIG. 8 shows a representation of such an alternate location frame 800 for use in a conforming client station. For example, one embodiment of a conforming client station receiving a transmit request frame such as the request frame 700 shown in FIG. 7 transmits such a location frame.

The first field 803 is 8-bytes long and contains a Sub-Network Access Protocol (SNAP) header to distinguish that the packet is by a particular manufacturer, in this case, a Cisco Aironet packet, by Cisco Technology, Inc., of San Jose, Calif., related to the assignee of the present invention.

The next field is a 2-byte field 805 called the Inter Access Point Protocol (IAPP) ID and length field that provides the overall length of the packet, e.g., from the start of the IAPP ID & Length field 805 to the end of the packet.

The next field is a 2-byte field 807 called the IAPP Type field that provides a receiving station—the receiving AP—with an indication that the packet is used for path loss measurement in order to determine location.

The next field is a 1-byte field 809 called the IAPP Subtype field that provides a receiving station—the receiving AP—with an indication that the packet is a measurement report.

The next field is a 6-byte field 811 that contains the destination MAC Address. In one embodiment, this is the predefined common Multicast address used for location services.

The next field is a 6-byte field 813 that contains the MAC address of the client sending the location frame 800.

The next field is a 2-byte field 815 called the Dialog Token field that contains a count to provide the receiving AP with a unique index for each transmitted path loss measurement (location) frame.

The next field is a 1-byte field 817 that contains the transmit power used to transmit the location frame, in dBm.

The next field is a 1-byte field 819 that contains the transmit channel used to transmit the location frame.

The next field is a 6-byte field 821 we call the Tag Data field that includes proprietary information that can be used for the particular manufacturer of the conforming client.

The final field 823 is of a variable length to make up the total packet length as in field 805. This field 821 can by used for additional information, and for later versions of this packet structure. In this manner, a client station transmitting a packet of structure 800 can be compatible with later packet structures that include more information in this additional field 823.

Figure 9A:
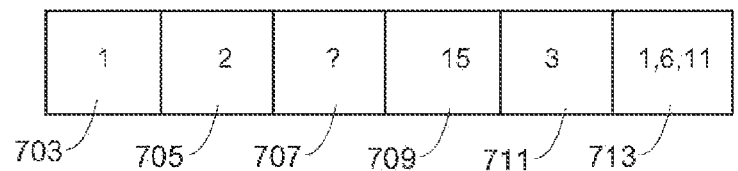
FIGS. 9A, 9B, and 9C show one example of a set of parameters and the resulting transmission of location frames by a conforming radio tag or client according to an aspect of the invention.
Figure 9B:
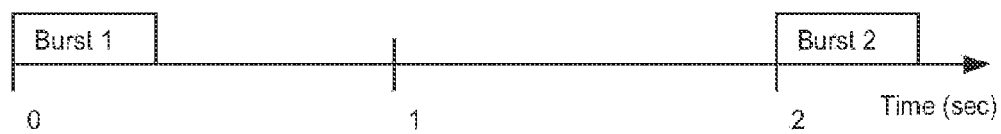
Figure 9C:
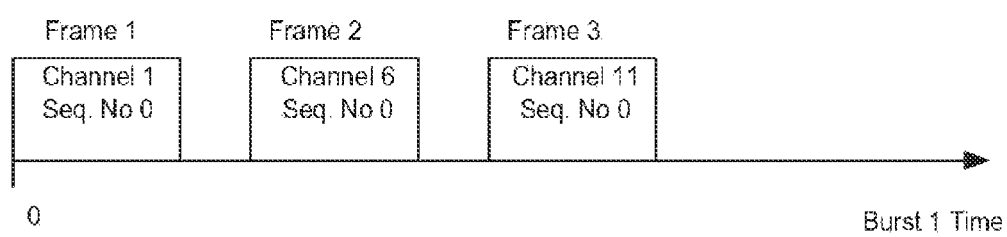

FIGS. 9A, 9B and 9C show a first example of how a conforming radio tag or conforming client may be set up to transmit location frames, e.g., having the common structure of FIGS. 5, 6A and 6B, or that of FIG. 8, either as a result of wirelessly receiving a frame 700 as described in FIG. 7, or after otherwise being set up. FIG. 9A shows for example, the fields of a transmit request frame 700. The parameters are as shown in the following table.

| | |
|---|---|
| Number of Path loss Measurement Burst Cycles: | 1 |
| Burst interval: | 2 seconds |
| Transmit power | 15 dBm |
| Number of channels per cycle: | 3 |
| The channel number list: | 1, 6, 11 |

FIG. 9B shows the two bursts separated by a 2-second interval. FIG. 9C shows the structure of a single burst, which can be seen to include transmission of three frames on channels 1, 6 and 11.

Figure 10A:
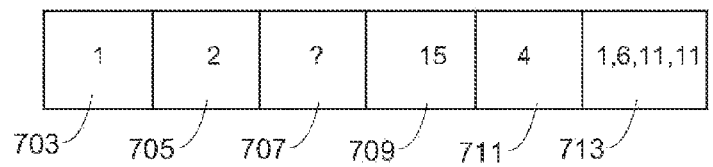
FIGS. 10A, 10B, and 10C show another example of a set of parameters and the resulting transmission of location frames by a conforming radio tag or client according to an aspect of the invention.
Figure 10B:
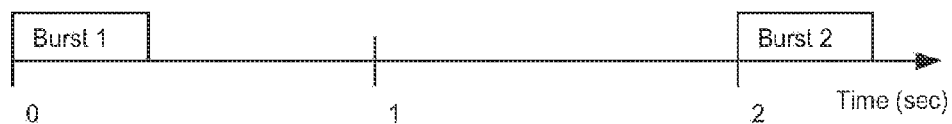
Figure 10C:
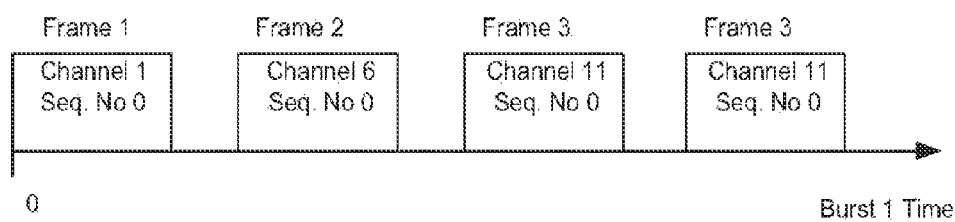

FIGS. 10A, 10B and 10C shows a second example of how a conforming radio tag or conforming client may be set up to transmit location frames. FIG. 10A shows for example, the fields of a transmit request frame 700. The parameters are as shown in the following table.

| | |
|---|---|
| Number of Path loss Measurement Burst Cycles: | 1 |
| Burst interval: | 2 seconds |
| Transmit power | 15 dBm |
| Number of channels per cycle: | 4 |
| The channel number list: | 1, 6, 11, 11 |

FIG. 10B shows the two bursts separated by a 2-second interval. FIG. 10C shows the structure of a single burst, which can be seen to include transmission of four frames on channels 1, 6, 11, and then again 11.

Figure 11A:
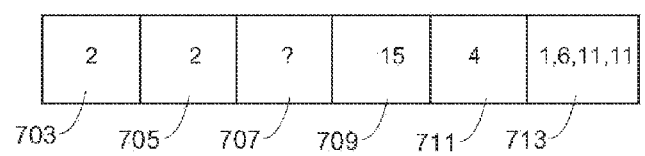
FIGS. 11A, 11B, and 11C show yet another example of a set of parameters and the resulting transmission of location frames by a conforming radio tag or client according to an aspect of the invention.
Figure 11B:
Figure 11C:
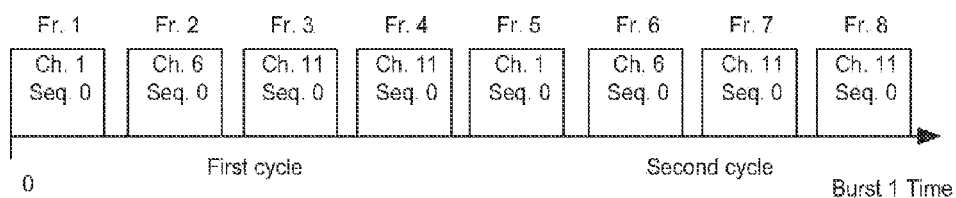

FIGS. 11A, 11B and 11C shows a third example of how a conforming radio tag or conforming client may be set up to transmit location frames. FIG. 11A shows for example, the fields of a transmit request frame 700. The parameters are as shown in the following table.

| | |
|---|---|
| Number of Path loss Measurement Burst Cycles: | 2 |
| Burst interval: | 2 seconds |
| Transmit power | 15 dBm |
| Number of channels per cycle: | 4 |
| The channel number list: | 1, 6, 11, 11 |

FIG. 11B shows the two bursts separated by a 2-second interval. Note that each burst now includes 2 cycles. FIG. 11C shows the structure of a single burst, which can be seen to include transmission of two cycles, each of four frames on channels 1, 6, 11, and then again 11.

The sequence numbers shown in each of FIGS. 9C, 10C, and 11C, in this example, are sequence number 0. These sequence numbers are incremented each transmission. Therefore, for the second burst, the sequence number would be 1.

According to yet another aspect of the invention, an access point receiving the location frames reports the measurement information to the location manager for location determination. For example, an AP receiving location frames periodically sends a Measurement Report Message. Then each station includes the type of station performing the measurement (AP, client, and so forth), the MAC of the measuring station, and the actual measurement data. Aspects of this invention use reports of beacons and probe responses received at a station that in one embodiment includes the received signal strength (RSSI), e.g., in dBm, the channel, the measurement duration, the BSSID, and other information in the beacon/probe response and of the station receiving the beacon/probe response.

In this description, it is assumed that IP encapsulation of UDP packets is used under the WLAN Manager-to-AP Measurement Protocol to send Measurement Report Messages from one or more managed APs about the location frames received, such that the location manager 131 can determine the location of the conforming clients or conforming radio tags, and according to another aspect of the invention, also determine the location of holes in the coverage of the wireless network.

The communication between the AP and location server is conducted through UDP/IP packets. The UDP ports on the AP and location server need to be defined on both the AP and location server. A defined value can be defaulted to the UDP port on the AP but it is also configurable through CLI and GUI.

When location based services are enabled on the AP, it starts to listen to the configured multicast group for location based service packets. For every received location based service packet, the AP copies the necessary information into the UDP packet data field and sends the packet to the location server.

Figure 12:
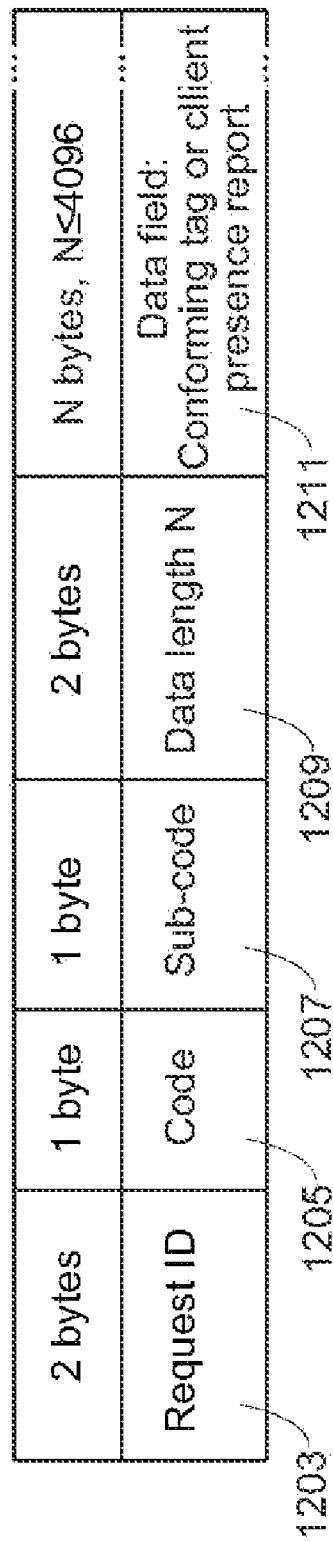
FIG. 12 shows a representation of one embodiment of a UDP Protocol Data Unit (PDU) for a report by an AP to a location server according to aspects of the present invention.

FIG. 12 shows a representation of UDP Protocol Data Unit (PDU) 1200 for a report by an AP. The UDP PDU header structure includes the following fields in a header part:

A 2-byte Request ID field 1203 that contains a serial ID number, a 1-byte message code field 1205 that provides the command or message code, which, in the case of a conforming tag or client report, in one embodiment, is 0x68, where x is any digit, and a 1-byte sub-code field 1207 that, if used, provides details of the command or message, and if not used, contains 0x00, where x is any binary value. For a tag report, the sub-code field 1207 contains 0x01, where x is any binary value.

The next field is a 2-byte Data field length 1209 that provides the length in bytes of the data field 1211 that contains the actual data, which in this case is a conforming radio tag or client station presence report. The content of the length field 1209 is greater or equal to 0x20 (32).

Figure 13:
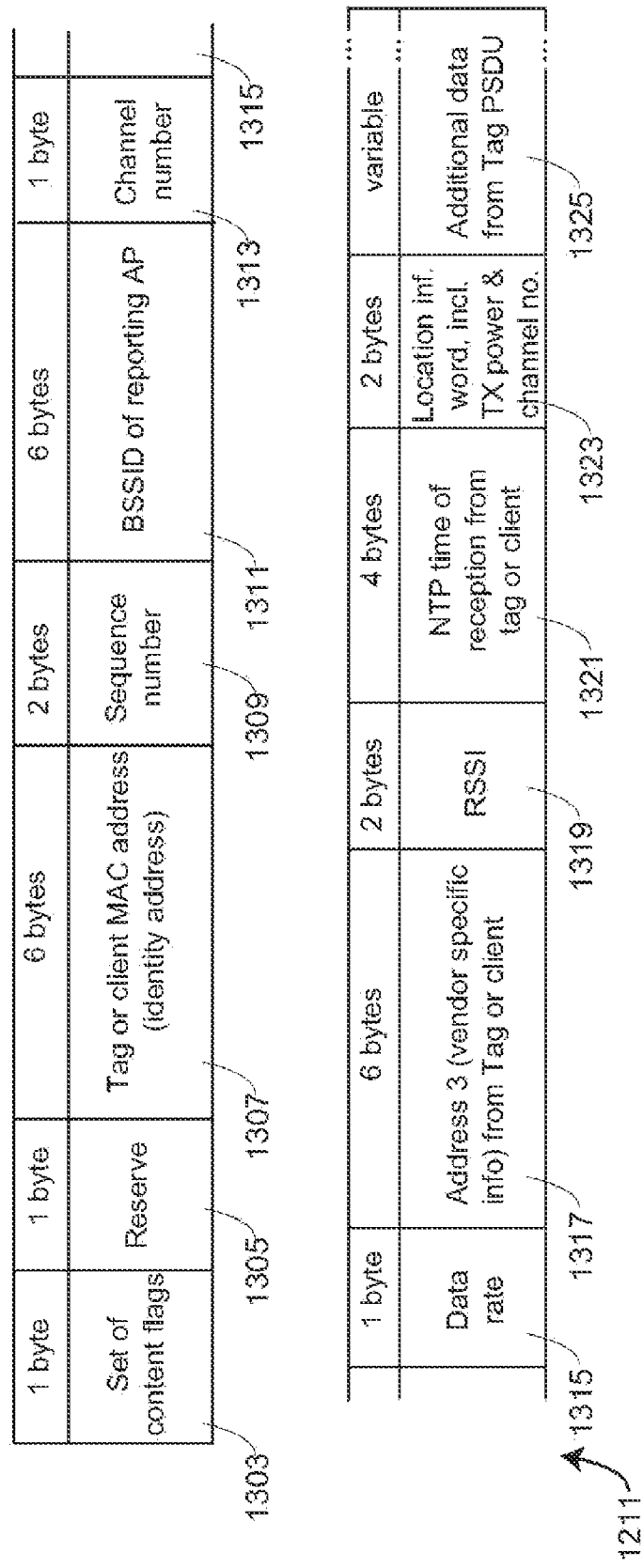
FIG. 13 shows a representation of one embodiment of how the data field containing the conforming radio tag or client information is arranged in the UDP PDU of FIG. 12.

FIG. 13 shows a representation of one embodiment of how the data field 1211 containing the conforming radio tag or client information is arranged.

In one embodiment, the data field 1211 starts with a 1-byte field 1303 we call the Contents flag. The lowest order bits in the flag are arranged as follows:

Bit 0 is a presence flag that should be always 1.
Bit 1 is reserved.
Bit 2 is an RSSI flag that should always be 1.
Next is a 1-byte field 1305 that in one embodiment contains the version number. In an early embodiment, the field is not used, but is reserved for later use.

In one embodiment, the next field in data field 1211 is a 6-byte field 1307 for MAC address of the conforming radio tag or client station. This information is obtained from the corresponding field in the PSDU received from the conforming radio tag or client station.

The next field in data field 1211 is a 2-byte sequence number field 1309 that contains the message sequence number. This information is also obtained from the corresponding field in the PSDU received from the conforming radio tag or client station.

The next field is a 6-byte field 1311 for the basis service set identifier (BSSID), e.g., the MAC address of the reporting AP.

The next field is a 1-byte Channel Number field 1313 for the channel number on which the AP received the PSDU from the conforming radio tag or client station. Then the next field is a 1-byte date-rate field 1315 that provides the data rate the PSDU was received at from the conforming radio tag or client station.

In one embodiment, the next field in data field 1211 is a 6-byte field 1317 called the Tag Data field that includes proprietary information that can be used for the particular manufacturer of the conforming client. This data is obtained from the corresponding field in the PSDU received from the conforming radio tag or client station.

The next field is 2-byte RSSI field 1319 that includes the RSSI value of the received PSDU, as a signed integer.

The next field is a 4-byte NTP time field 1321 that provides the network time protocol (NTP) time of the AP's receiving the conforming radio tag or client station packet.

The next field is a 2-byte Location Information Word field 1323 that provides the Location Information Word, including the TX Power and Channel Number provided by a conforming tag, as shown in FIG. 6B.

The final field is a variable length field 1325 that contains any additional data from the received PSDU transmitted by the conforming radio tag or client station.

Thus, the location information from a plurality of APs is sent to the location server. The location server then determines the location of each conforming radio tag or client station using a signal strength based location determining method.

Location Determining

Figure 14:
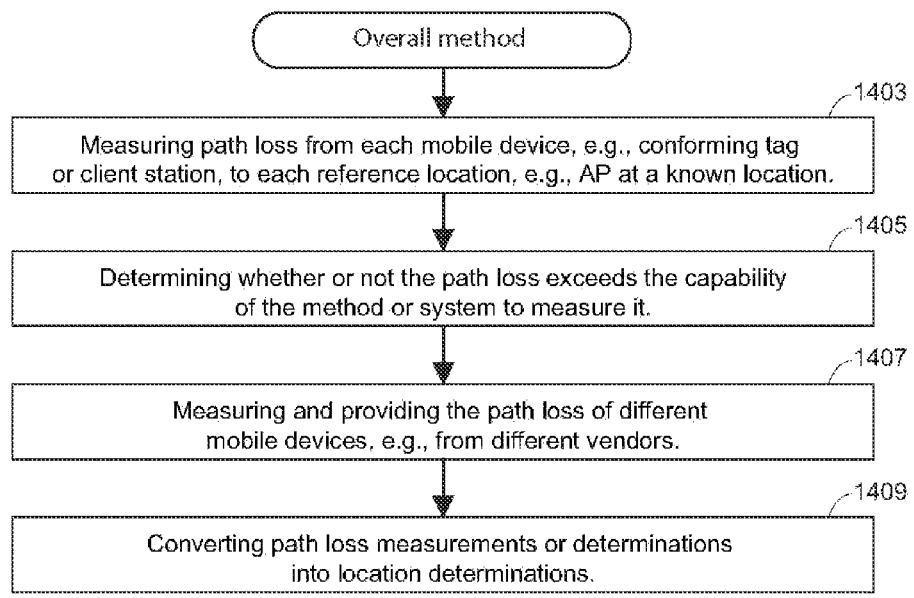
FIG. 14 shows a flow chart of method steps that the inventors have found contribute, individually or together, to the success of a location method based on received signal strength measurements.

The inventors have identified elements that contribute to the success of a received signal strength based location system. FIG. 14 shows the elements, shown as method steps, that have been identified as contributing to a successful method. The steps include:

1. Element 1403 of measuring the path loss from each mobile device of interest, e.g., from a conforming radio tag or client station, to each of a set of reference location, e.g., each of a set of APs at a known location. Step 1403 is preferably carried out with relatively high accuracy.
2. Element 1405 of determining whether or not the path loss measured in step 1403 exceeds the capability of the method or system to measure it. This provides for discarding those measurements that are determined to be not of sufficient accuracy.
3. Element 1407 of measuring the path loss for transmissions for different mobile devices, and providing such measurements, e.g., to a location server. For example, it is desired that the system is capable of measuring and processing both conforming tags and client stations from different vendors.

4. Element 1409 of processing the provided path loss measurements to convert the path loss measurements or determinations into location determinations.

A method and system for determining location based on path loss measurements requires at least one, and preferably all of these elements.

Measuring Path Loss (Element 1403)

In order to relatively accurately measure path loss, one aspect of the invention includes using stations having a transmitter with transmit power calibrated to reasonable accuracy, transmitting with a known transmit power, transmitting on a known channel, and receiving on a receiver calibrated to reasonable accuracy. These aspects are described above.

To summarize, aspects of the invention are intended for operation under extensions to the IEEE 802.11 specifications that deal with the ability of stations to transmit at a transmit power that is known and is accurate to within a pre-defined level of accuracy. In particular, the Cisco Compatible Extensions For WLAN Devices ("CCX"), by Cisco Systems, Inc., of San Jose, Calif. is used under which a compliant client is able to transmit with a transmit power accuracy of ±3 dB. Aspects of the present invention are intended to operate with radio compliant radio tags and with compliant client stations, within a managed WLAN. Furthermore, the APs in the WLAN have a radio receiver that provides a received signal strength indication signal that has been calibrated such that a relatively accurate measure of the received signal strength (RSSI) is available. For example, Cisco brand radio receivers used in Cisco brand access points by Cisco Systems, Inc., San Jose, Calif., related to the assignee of the present invention, undergo a rigorous calibration process such that the RSSI measure provided by the radio receivers are relatively accurate over time and temperature. Furthermore, as described above, data frames sent from conforming tags and clients periodically transmitted to APs include fields to indicate their transmit power and transmit channel.

When all these components are in place it is possible to obtain an accurate path loss estimate, denoted "Path loss estimate." The path loss estimate is obtained as follows, with all quantities on a logarithmic scale:

Path loss estimate=$TX$ power–$RSSI$ estimate of $AP$, where "TX power" denotes the transmit power conveyed in the message from the radio tag or client to the AP, and "RSSI estimate of AP" denoted the RSSI estimate obtained from a calibrated receiving AP.

Ensuring Measurement with System Capability (Element 1405)

One embodiment of the invention includes element 1405 of determining whether or not the path loss measured in step 1403 exceeds the capability of the method or system to measure it.

Conforming radio tags and clients transmit with a known transmit power. One embodiment of the access points provides sensitivity measures obtained by measurement or simulation. For example, the sensitivity of access points made by Cisco in typical indoor channels is precisely determined by multipath simulators, and stored on the access points themselves.

Element 1405 includes determining the maximum measurable path loss which is calculated as follows:

Max_measureable_path loss=$TX$ Power–Receiver Sensitivity, where "Max_measureable_path loss" denotes the maximum measurable path loss, "TX Power" denoted the transmit power conveyed in the message from the radio tag or client to the AP, and "Receiver Sensitivity" denotes the minimum receiver sensitivity stored in the AP, or otherwise available to the location server. Note that all measurements are in a logarithmic scale.

If a conforming radio tag or client is detected on some APs, and not on others, one embodiment assumes that the path loss from the conforming radio tag or client to the APs that do not detect it is more than Max_measureable_path loss.

Measuring and Providing the Path Loss (Element 1407)

The measuring of the path loss includes providing the path loss, or elements needed to determine the path loss, to APs and therefrom to the location server 131. The frame formats described above provide a mechanism for different manufacturers to ensure that radio tags and/or client stations are able to send the information to access points. One frame format is suitable for radio tags and clients and is designed to ensure limited power is required. Another is for client stations that conform to a set of extensions to the IEEE 802.11 specification, in particular, for clients that conform to CCX, or a similar set of extensions to the 802.11 standard.

Processing the Provided Path Loss Measurements to Determine Location (Element 1409)

Figure 15:
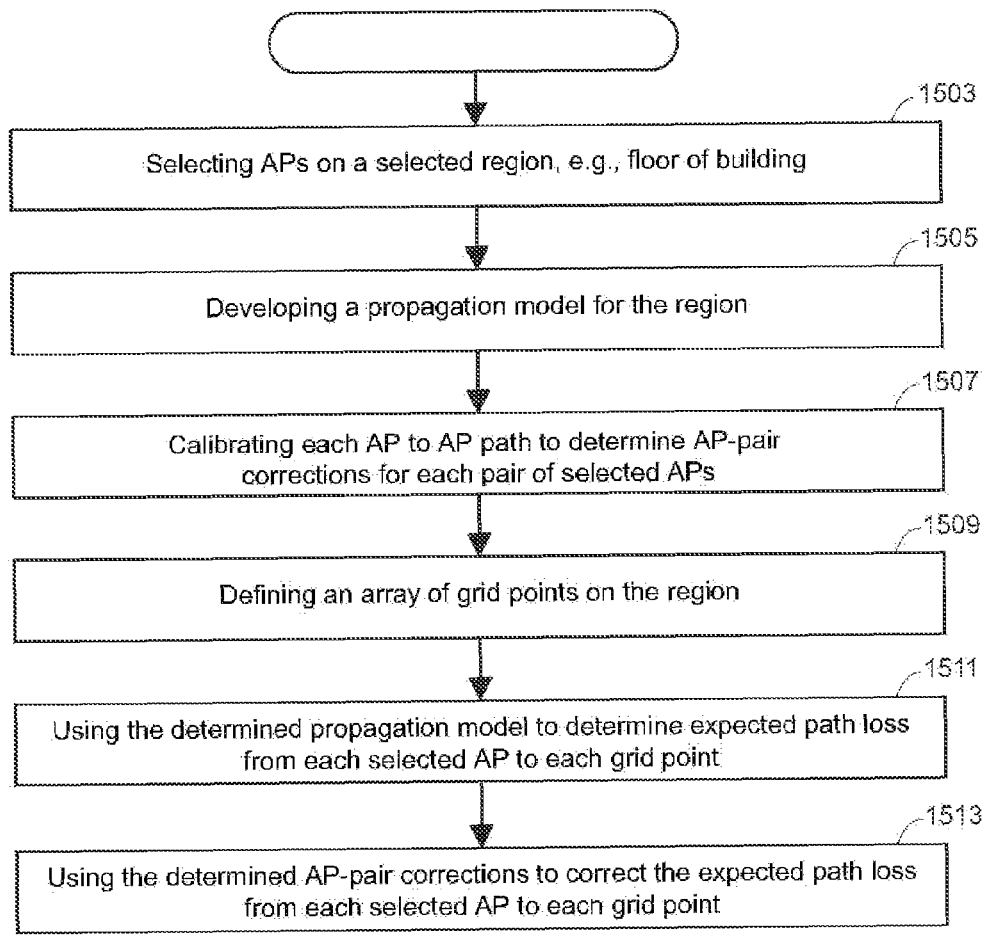
FIG. 15 shows a flow chart of one embodiment of developing a path loss coverage model for location determining.

Many methods are available and known for processing path loss measurements to convert these path loss measurements to a set of locations of conforming radio tags or clients. While alternate embodiments can use different methods, one embodiment includes, for a selected region, e.g., a floor of a building, developing a coverage model of the region. FIG. 15 shows a flow chart of one embodiment of developing the coverage model. The method includes in 1503 selecting a set of APs in a selected region, e.g., a floor of building. Each AP is at a known location. For example, all the managed APs on the floor can be selected. The method further includes in 1505 developing a propagation model for the region that provides a mapping of distance and path loss between pairs of APs. The method further includes in 1507 calibrating each AP to AP path to determine AP-pair corrections for each pair of selected APs.

The method also includes in 1509 defining an array of grid points in the region. The locations are then determined to the nearest grid point. Thus each AP is located at some location within the array of grid points.

The method further includes in 1511 using the determined propagation model to determine an expected path loss from each selected AP to each grid point, and in 1513 using the determined AP-pair corrections to correct the expected path loss from each selected AP to each grid point. This provides a coverage model.

The coverage model is then used to find the most likely location of the client. The coverage model provides for each grid point the path loss to each of the access points in the region. For a plurality of APs, this forms a vector of paths losses—a path loss vector—for each grid point.

The elements of the flowchart of FIG. 15 are now described in more detail.

Figure 16:
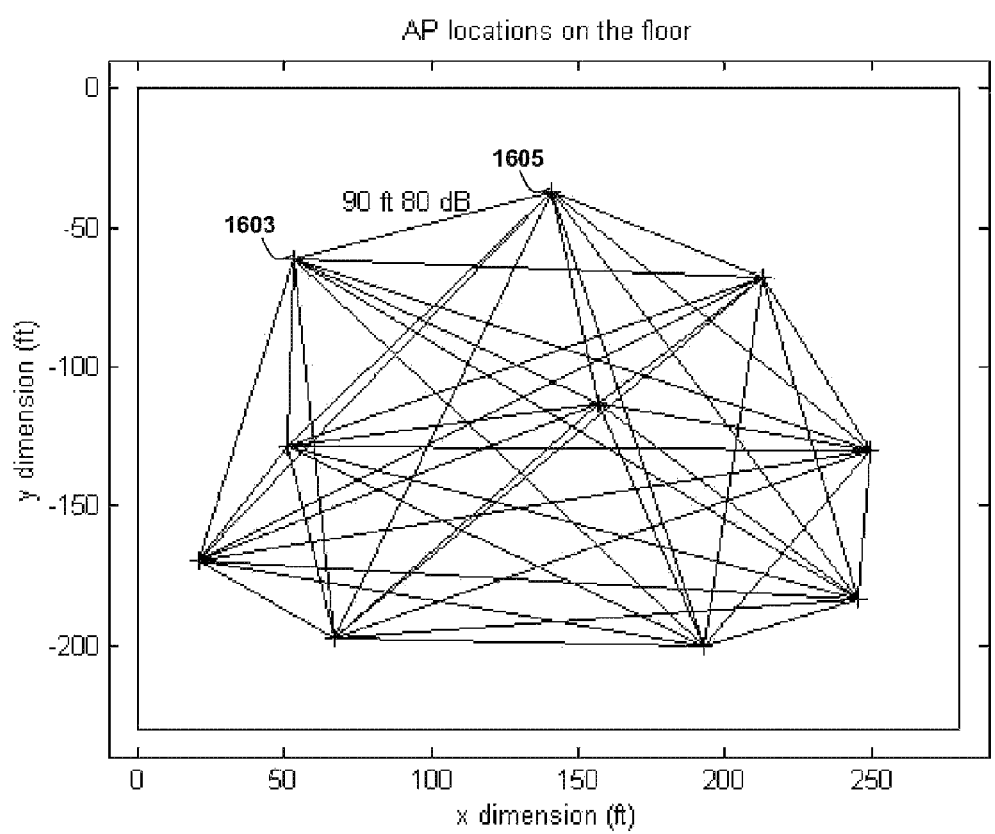
FIG. 16 shows an exemplary set of selected APs in a selected region, e.g., on a floor of a building for use in location determining.

In 1503, a set of APs at known locations is selected. By way of an example, FIG. 16 shows a set of selected APs in a selected region, e.g., a floor of building. Each AP is marked with a + and in one embodiment, is a managed AP at a known location. For example, all the managed APs on the floor can be selected.

1505 includes developing a propagation model including a mapping of distance and path loss between pairs of APs. Each pair of APs will either have an RF link or it will not have an RF link. If the pair of APs has an RF link, the distance between the APs is calculated from the known locations of the APs. The path loss between the APs is measured by a scan. That is, each AP listens for the beacons of the other AP. The transmit power of the beacons is provided to the location server. Therefore, as an example, in FIG. 16, the pair of APs 1603 and 1605 are shown as being 90 ft apart, and having a path loss of 80 dB between them, e.g., as measured on a particular channel.

The ordered pairs (distance, path loss) are used to form a propagation model for the selected region or regions, e.g., for each floor of a building. In one embodiment, the propagation model is a linear path loss-vs. distance model obtained as follows.

The first step in forming a propagation model is to tabulate the data in the proper format. FIG. 21 shows a table of the distance, denoted d, (in feet) between each pair of access points, the $\log_{10}$ of the distance d, and the path loss in dB between the pairs of access points where a link exists for an experiment performed using 802.11b APs. Note that those paths with very large path loss are excluded because no link exists, therefore, the data is expected to be negatively biased.

For pairs of access points where no link exists, similar data is obtained, except that the path loss is now the maximum path loss, 112 dB, that can be measured between two 802.11b stations. In the example, only one pair of APs, 228 ft apart, had no link.

To process this data, one embodiment includes fitting a linear propagation vs. distance model to the link data, e.g., of the table shown in FIG. 21.

In some cases, the inventors have found that buildings will be so large that there will be many more non-links than there are links. When this occurs, one embodiment includes a data selection procedure to define a maximum range.

The selection process includes:
1. Sorting all potential links by range.
2. Starting at the shortest range, logging the ratio of links to potential links.
3. Repeating the logging at the next shortest range until the maximum range is reached.
4. Selecting the largest range for which the ratio of links to potential links is greater than 0.85. The largest range is denoted "Max Range."
5. Selecting only the potential links with range less than Max Range for forming a propagation model.

The fitting of a linear model includes, in the case there are "plenty" of data points, e.g., more than 20 links, using the linear model $$PL = A*LR + B,$$

where * denoted multiplication, PL is the pathloss data (in dB), and LR is the Log10(d) data, where d is the distance in feet, and A and B are constants determined as follows:

$$\begin{vmatrix} A \\ B \end{vmatrix} = \begin{vmatrix} \sum LR*LR & \sum LR \\ \sum LR & \sum 1 \end{vmatrix}^{-1} \begin{vmatrix} \sum PL*LR \\ \sum PL \end{vmatrix},$$

where the summation occurs over all the elements in the link data set.

When there is an intermediate number of links, e.g., between 1 and 20 links, we assume a default path loss exponent and do a zero-order fit. One embodiment uses the path loss model $$PL = 35*LR + B,$$

where PL is the pathloss data in dB, LR is the Log10 (distance) data, with the distance in feet, and B is a constant determined as follows:

$$B = \sum_{Links} (PL - 35*LR) / (\text{number\_of\_links})$$

Furthermore, when there are no links, the following path loss models are assumed:

$PL = 35*LR + 22$ for 2.4 GHz $PL = 35*LR + 30$ for 5 GHz.

Thus, with the data of FIG. 21, one starts with a linear data fit. Excluding the no-link data provides the line:

$PL = 54.7*LR - 20$

Next, the no-link data is concatenated to the end of the link data and another curve fit is performed, this is referred to as the Total Fit, because it fits all the data. For the example of the data of FIG. 21 and the no-link data, $PL = 55.6118*LR - 21.8357$ This model is still negatively biased because the path losses greater than the maximum are clipped to their maximum values.

In one embodiment, the model including the no-link data, called the "Bias Fit" model and the model without the no-link data, called the "Total Fit" Model, are combined to form what we call the "Corrected Fit" model as follows:

Corrected Fit Model = 2*Total Fit Model − Bias Fit Model

In the example of FIG. 21 and the no-link data, $PL = 56.4874*LR - 23.5761$

Figure 17:
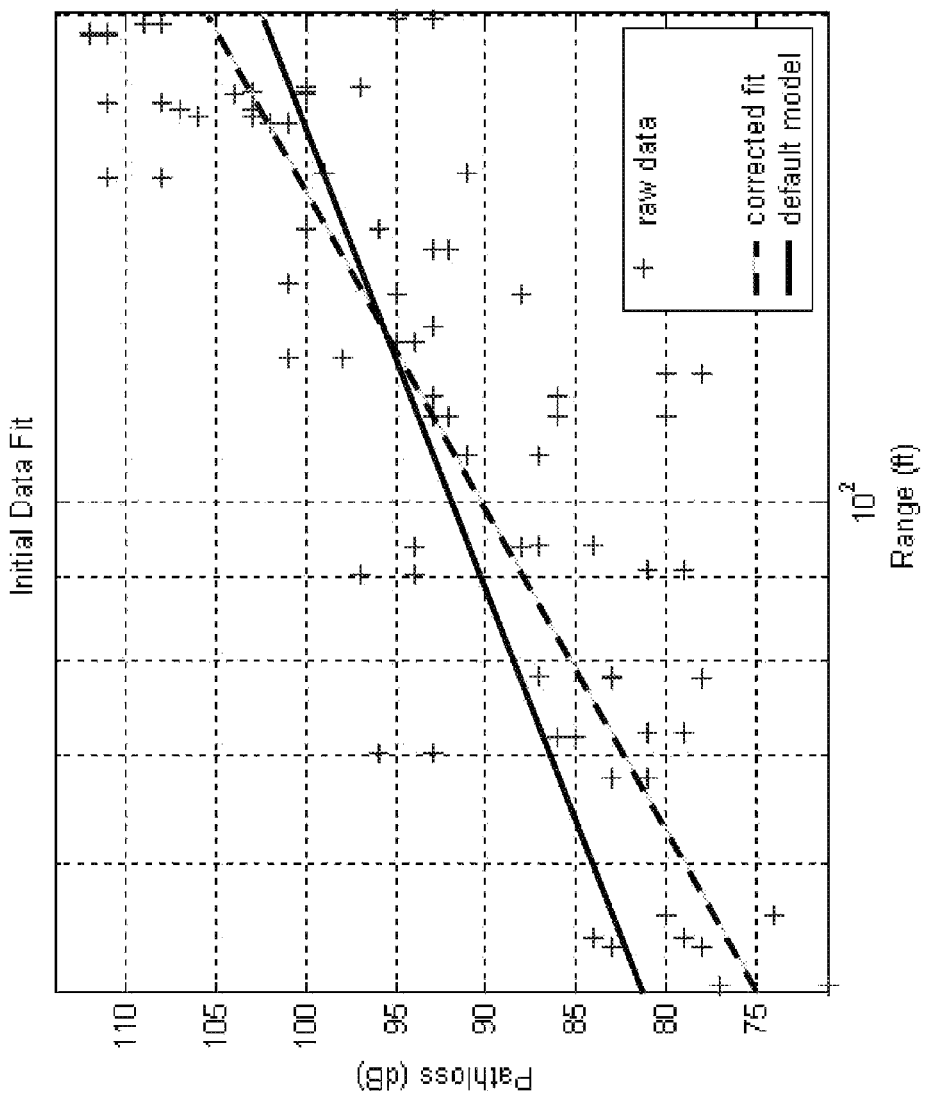
FIG. 17 shows the propagation model plots formed according to one embodiment of the invention using the exemplary set of selected APs of FIG. 16.

FIG. 17 shows the propagation model plots thus formed. Each '+' on the plot shows the measured path loss vs. distance between a pair of APs. The broken line shows a least-squares fit to the data for all AP pairs. This broken line is the "Corrected Fit" model referred to above. The slope and intercept of each best-fit line will vary from building to building, floor to floor. The solid line shows a default propagation model that would be used if no link data is available. It yields path loss predictions that are too large at short range and too small at long range.

One embodiment includes in 1507 calibrating each AP to AP path as predicted by the path loss model to determine AP-pair corrections for each pair of selected APs. Thus, more correction is provided to the obtained path loss model. This includes adding local and directional corrections to the path loss model to effectively model the shadowing between access points.

One embodiment calculates these further corrections as follows:

For each pair of APs, use the Corrected Fit model described above (see also FIG. 17) and the distance between access points to calculate the predicted pathloss between the pair of APs. A correction term is now calculated for each pair of APs. The correction term is the difference between the measured path loss, and the path loss predicted by the determined propagation model.

Figure 18:
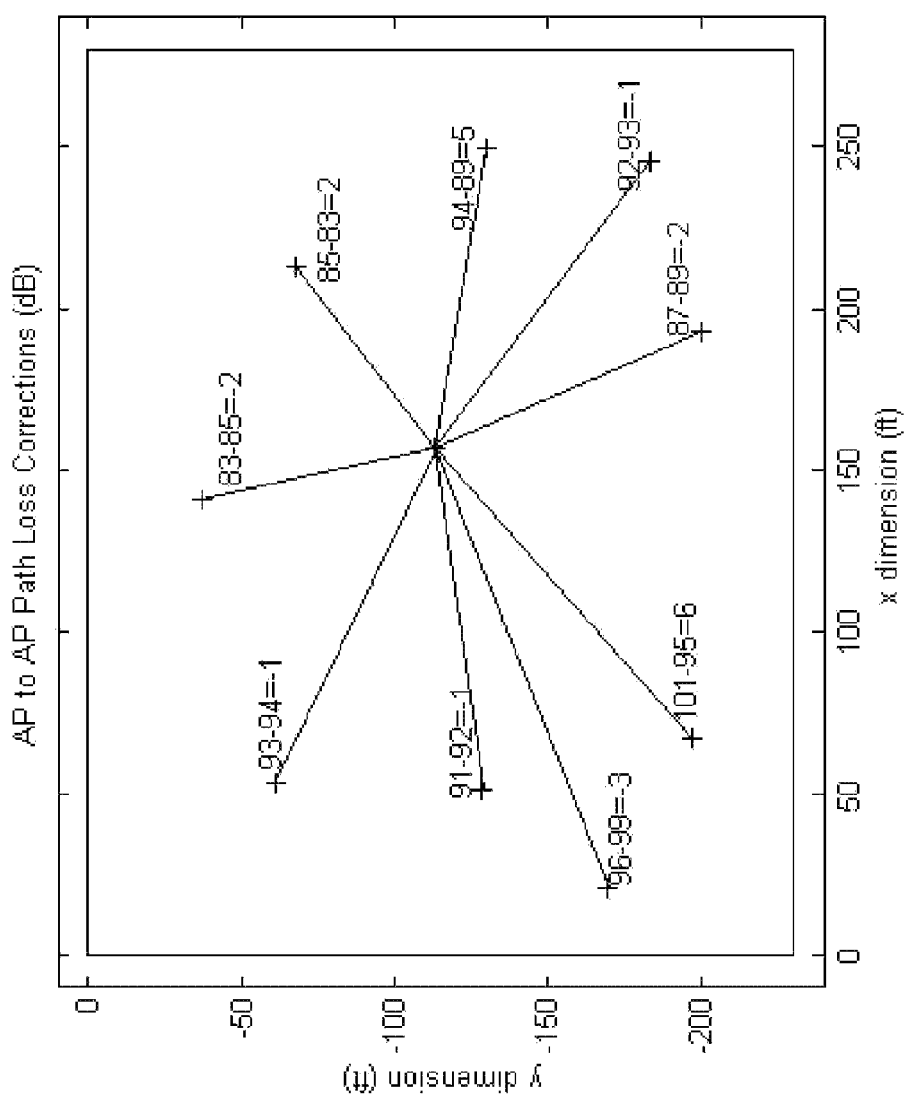
FIG. 18 shows the correction terms between the AP in the middle of a region, and all other APs in a region of interest.

FIG. 18 shows the correction terms between the AP in the middle of the region, and all other APs in the region of interest.

The following describes in more detail how corrections may be calculated. Table 1 below shows the distances between access points of the data shown in FIG. 21.

TABLE 1

Distance Matrix

| 0 | 205 | 76 | 178 | 172 | 228 | 71 | 150 | 134 |
|---|---|---|---|---|---|---|---|---|
| 205 | 0 | 181 | 103 | 89 | 60 | 146 | 172 | 79 |
| 76 | 181 | 0 | 119 | 184 | 183 | 103 | 75 | 102 |
| 178 | 103 | 119 | 0 | 164 | 73 | 152 | 76 | 66 |
| 172 | 89 | 184 | 164 | 0 | 147 | 101 | 209 | 104 |
| 228 | 60 | 183 | 73 | 147 | 0 | 181 | 149 | 94 |
| 71 | 146 | 103 | 152 | 101 | 181 | 0 | 158 | 91 |
| 150 | 172 | 75 | 76 | 209 | 149 | 158 | 0 | 106 |
| 134 | 79 | 102 | 66 | 104 | 94 | 91 | 106 | 0 |

A predicted path loss matrix is determined by applying the corrected fit model to the data in the distance matrix to form a matrix of predicted path losses between pairs of access points. Table 2 below shows this predicted path loss matrix.

TABLE 2

Predicted path loss matrix

| 0 | 107 | 83 | 104 | 103 | 110 | 81 | 99 | 97 |
|---|---|---|---|---|---|---|---|---|
| 107 | 0 | 104 | 90 | 87 | 77 | 99 | 103 | 84 |
| 83 | 104 | 0 | 94 | 104 | 104 | 90 | 82 | 90 |
| 104 | 90 | 94 | 0 | 101 | 82 | 100 | 83 | 79 |
| 103 | 87 | 104 | 101 | 0 | 99 | 90 | 108 | 90 |
| 110 | 77 | 104 | 82 | 99 | 0 | 104 | 99 | 88 |
| 81 | 99 | 90 | 100 | 90 | 104 | 0 | 101 | 87 |
| 99 | 103 | 82 | 83 | 108 | 99 | 101 | 0 | 91 |
| 97 | 84 | 90 | 79 | 90 | 88 | 87 | 91 | 0 |

These predicted path losses are subtracted from the measured path losses, shown in Table 3 below of the measured path loss matrix:

TABLE 3

Measured path loss matrix

| 200 | 109 | 71 | 103 | 106 | NL | 74 | 85 | 101 |
|---|---|---|---|---|---|---|---|---|
| 108 | 200 | 92 | 91 | 95 | 81 | 104 | 103 | 87 |
| 73 | 91 | 200 | 90 | 110 | 105 | 88 | 83 | 81 |
| 103 | 93 | 90 | 200 | 101 | 85 | 96 | 76 | 87 |
| 106 | 94 | 111 | 104 | 200 | 105 | 96 | 108 | 90 |
| 110 | 85 | 108 | 88 | 104 | 200 | 110 | 94 | 90 |
| 78 | 108 | 89 | 99 | 98 | 112 | 200 | 96 | 91 |
| 89 | 103 | 87 | 79 | 109 | 94 | 97 | 200 | 92 |
| 101 | 87 | 85 | 88 | 92 | 89 | 90 | 91 | 200 | where NL means no link, to generate the correction matrix shown in Table 4.

TABLE 4

Correction matrix

| −3 | 2 | −12 | −1 | 3 | 2 | −7 | −14 | 4 |
|---|---|---|---|---|---|---|---|---|
| 1 | 1 | −12 | 1 | 8 | 4 | 5 | 0 | 3 |
| −10 | −13 | −4 | −4 | 6 | 1 | −2 | 1 | −9 |
| −1 | 3 | −4 | 0 | 0 | 3 | −4 | −7 | 8 |
| 3 | 7 | 7 | 3 | 4 | 6 | 6 | 0 | 0 |
| 0 | 8 | 4 | 6 | 5 | 3 | 6 | −5 | 2 |
| −3 | 9 | −1 | −1 | 8 | 8 | 3 | −5 | 4 |
| −10 | 0 | 5 | −4 | 1 | −5 | −4 | −2 | 1 |
| 4 | 3 | −5 | 9 | 2 | 1 | 3 | 0 | 2 |

In the above calculation, usually, the path loss correction (in dB) is the measured path loss minus the predicted path loss. However, if no measurement exists, if the predicted path loss is less than the maximum measurable path loss, than the path loss correction is the maximum measurable path loss less the predicted path loss and if the predicted path loss is not less than the maximum measurable path loss, then the path loss correction is 0. Furthermore, the diagonals of the path loss correction matrix are obtained, in one embodiment, by taking a mean of the elements that are not on the diagonal. For example, the value of the first diagonal element is calculated at:

Mean(2 −12 −1 3 2 −7 −14 4)=−3

Note that in the above Tables, all the distance values, path loss values, and correction terms have been rounded to keep the formatting simple.

The significance of the diagonal elements of the matrix is a quantified measure of how much the path loss to and from that access point differs from the values predicted by the corrected fit.

The significance of the non-diagonal elements is a quantified measure of how much the path loss from one AP to another different AP differs from that predicted by the corrected data fit.

Thus, a propagation model is obtained that takes into account local propagation characteristics (diagonal elements of the correction metric), directional propagation characteristics (non-diagonal elements) and differences in the receivers.

Figure 19:
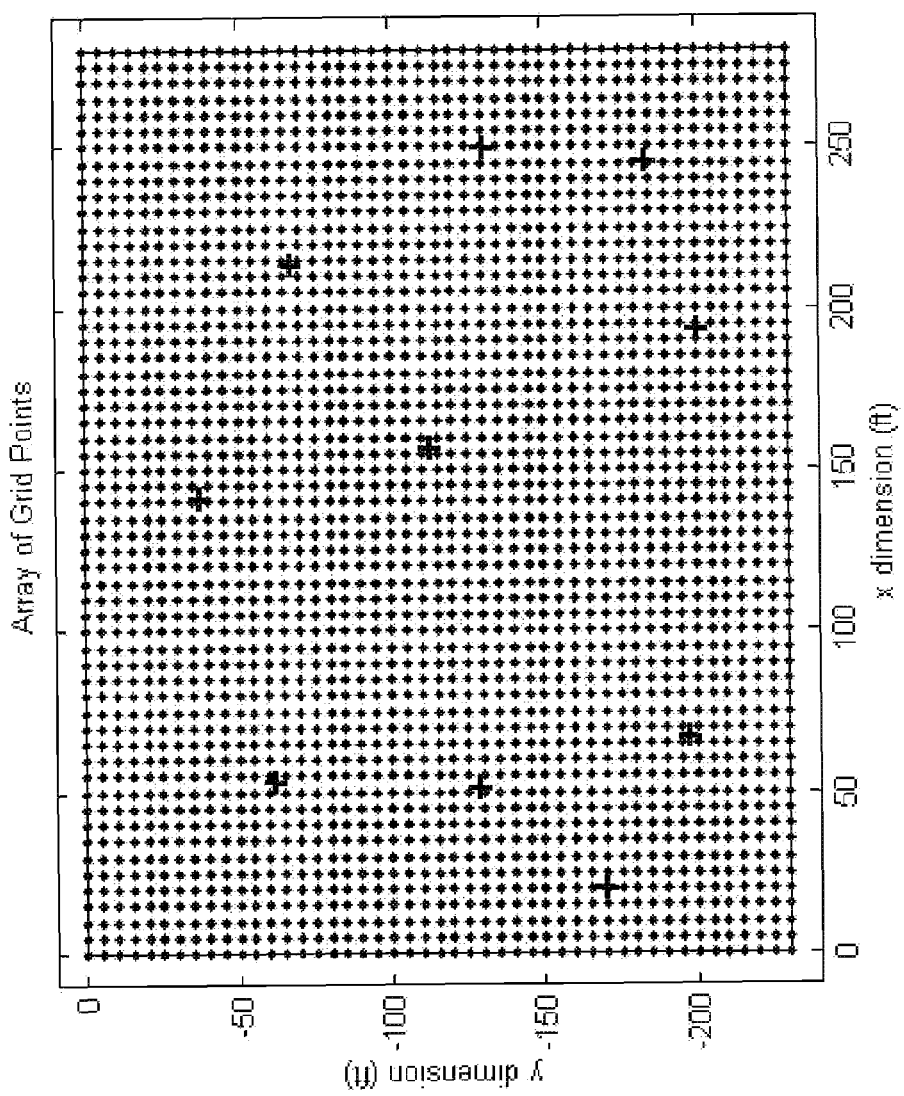
FIG. 19 shows one array of grid points separated by 5 feet for the access points of FIG. 17 used in an example described herein to determine the path loss to each grid point according to aspects of the present invention.

The method also includes in 1509 defining an array of grid points in the region. The locations are then determined to the nearest grid point. Thus each AP is located at some location within the array of grid points. FIG. 19 shows one such array of grid points separated by 5 feet for the access points used in the examples. The propagation model and AP to AP calibration data (the correction matrix) are used in 1511 and 1513 to predict the path loss from each AP to each grid point. This provides a coverage model. The predicted path loss from each grid point to each access point is then used for location determination to find the most likely location of a conforming radio tag or client. As described further below, another aspect of the invention is that such a predicted path loss from each AP to each grid point can also be used to generate coverage maps for each AP, and to determine coverage holes in a region containing multiple APs.

Figure 20:
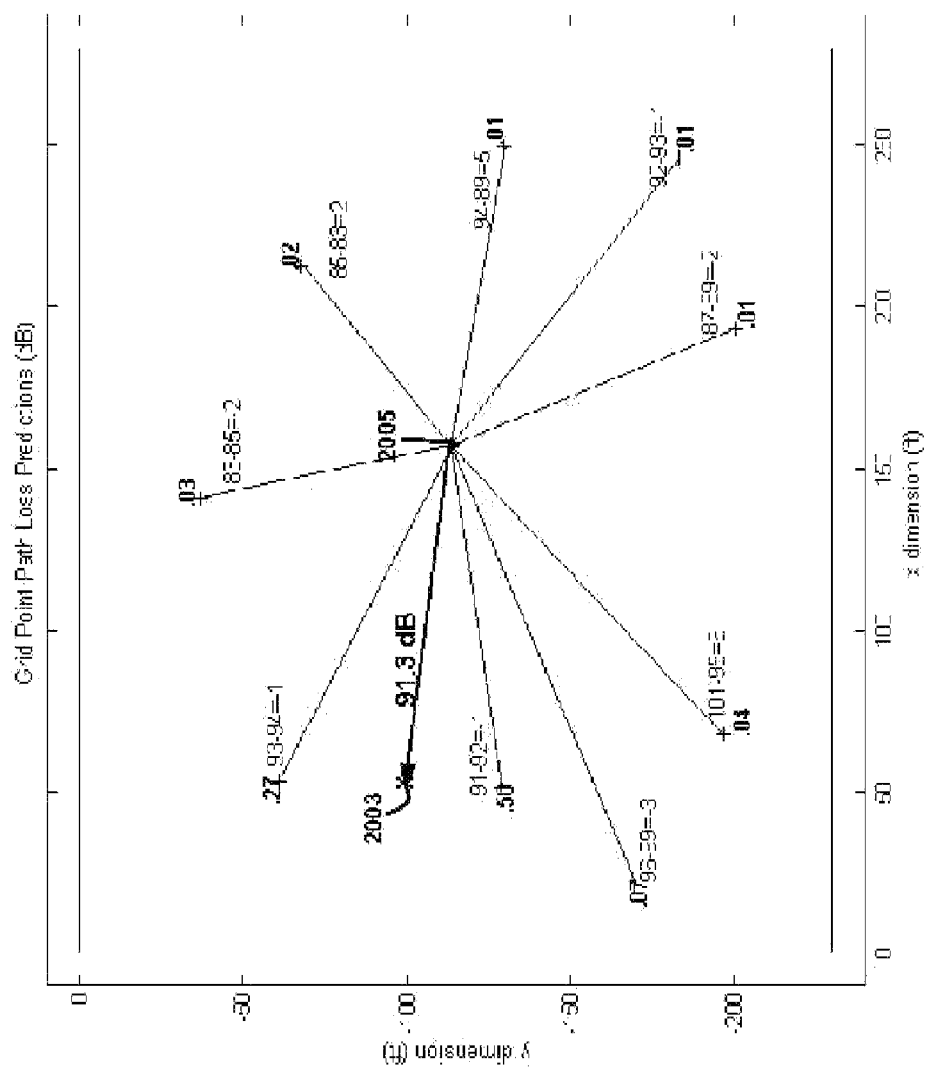
FIG. 20 shows an example of path loss prediction describing how according to one embodiment of the invention, the path loss is calculated from a single grid point to a single AP.

FIG. 20 shows an example of path loss prediction describing how according to one embodiment, the path loss is calculated from a single grid point 2003 to a single AP 2005.

First the path loss from the AP 2005 to the grid point 2003 is calculated using the propagation model. This gives 91.3 dB. Next a correction term is calculated using a weighted sum of correction terms from all APs. In one embodiment, the nearby APs correction terms are weighted more heavily, e.g., by 0.50, than the Distant AP correction terms, weighted, e.g., by 0.01.

In an alternate embodiment, a more complicated weighting is included. For such a method, the path loss from each grid point to each access point is calculated as follows:

1. Calculate the distance from the grid point to the access point.
2. Estimate the path loss from the grid point to the access point using the log of the distance and the Corrected Data Fit.
3. Calculate a correction term as follows:
    A. Calculate the distance from the grid point to all the access points.
    B. Use a weighting for each access point inversely proportional to the distance squared to the AP. Weighting=1/(distance to AP)^2.

C. If one of the weighting terms is greater than the sum of all the others, change the weighting term to the sum of all the others.

D. Normalize so the sum of all weighting terms is 1.

4. Apply the correction term as follows:

A. Start with the path loss correction matrix. For example, Table 4 above.

B. Consider the weighting terms. As an example, consider:

0.1 0.2 0.2 0.1 0.1 0.1 0.1 0.05 0.05

C. Choose the appropriate row from the path loss correction matrix. As an example, to calculate the path loss correction from a grid point to the first AP, choose the first row of the path loss correction matrix. Combine with the weighting terms to give, in the example, Path loss correction=$\Sigma[-3\ 2\ -12\ -1\ 3\ 2\ -7\ -14\ 4]*$
$[.1\ .2\ .2\ .1\ .1\ .1\ .1\ .05\ .05]=-3.1$ 5. Correct the path loss as follows:

Predicted path loss=uncorrected predicted path loss−path loss correction.

For location calculation, every grid point has a path loss vector, i.e., a path loss to each access point in the region of interest. Now any conforming radio tag or client also has a path loss vector to each AP that receives its transmission of the frame as described above. One embodiment of the method includes the location server determining the path loss vector of a grid point that is closest to the measured path loss vector for the radio tag or client. Many measures of closeness of vectors may be used, and in one embodiment, the Manhattan distance, defined as the sum of the absolute distances, is used. In another, the Euclidian distance is used. The invention does not depend on any particular definition of closeness.

Note also that in another variation, probability distributions are formed rather than the measure of closeness. See the Kaiser et al. invention for one such variation.

Figure 22:
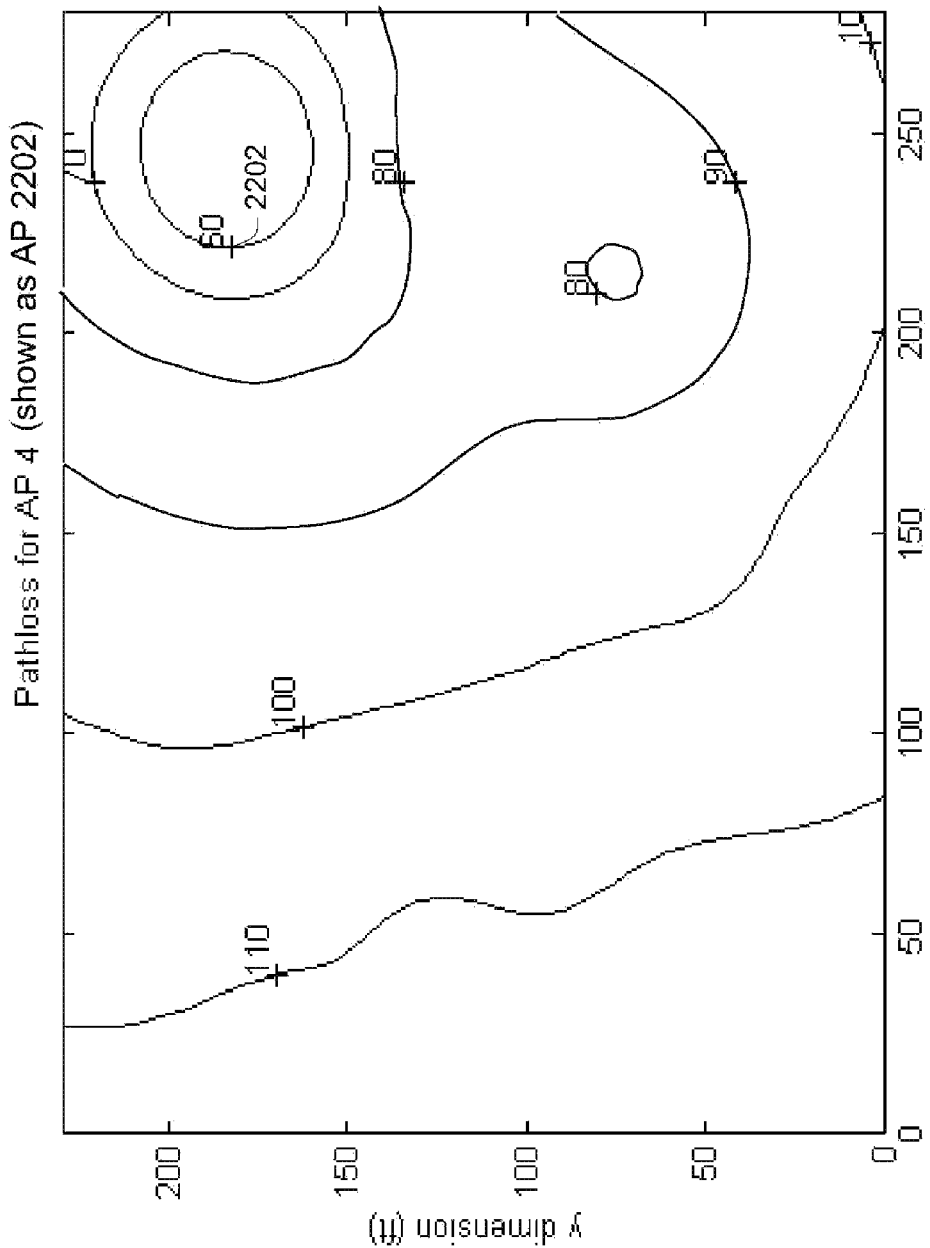
FIG. 22 shows contours of path loss from one of the APs of the exemplary set, according to an aspect of the present invention.

Another aspect of the invention is that the path loss vectors can be used to determine coverage maps of any AP. Using the above predicted path loss, FIG. 22 shows contours of path loss from one of the APs, shown as AP 2202. As can be seen, close to the AP, the contours are circular, and as one moves away from the AP, the contours change under the directional influence, e.g., of the other APs.

Figure 23:
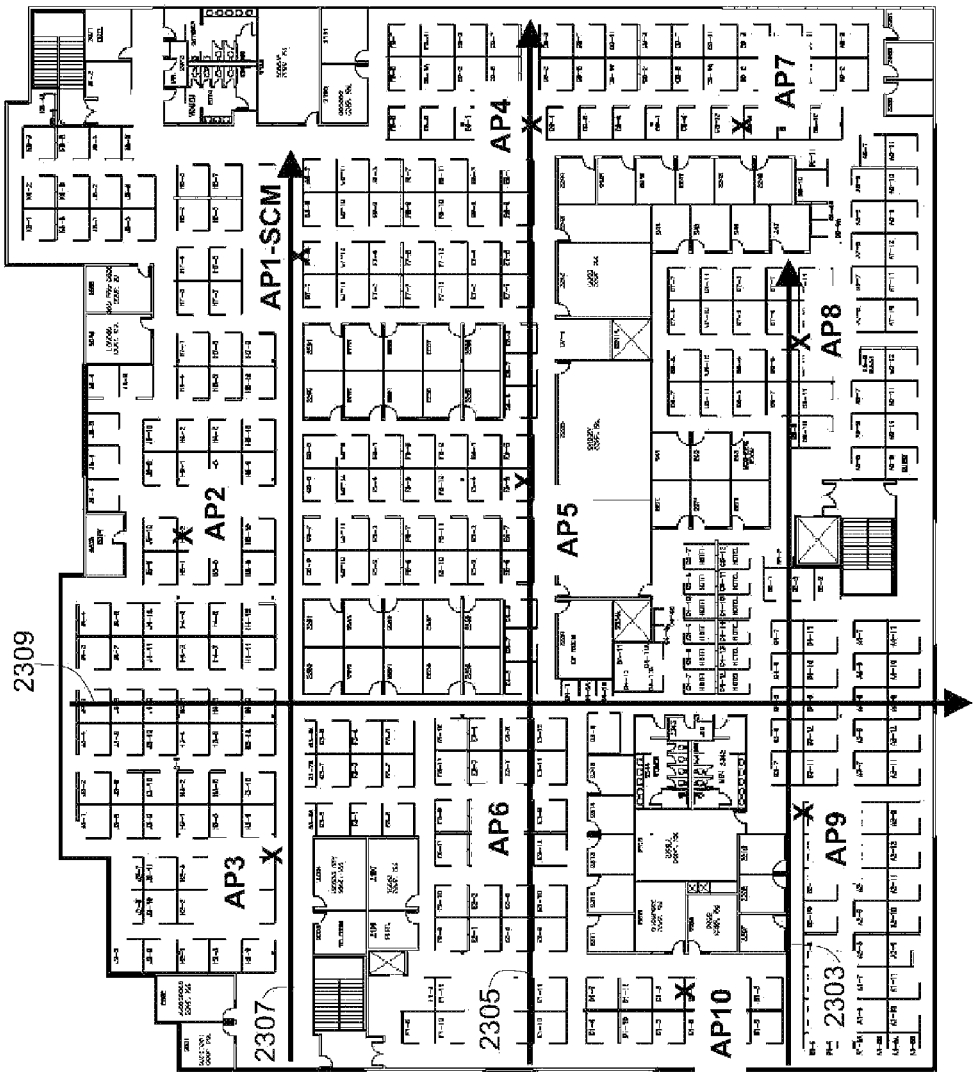
FIG. 23 shows a map of the floor of a building where experiments were performed to determine how well an embodiment of the present invention performed with actual data.

FIG. 23 shows a floor of a building where actual experiments were performed. The APs are marked with an X. Four walk-throughs were performed to see how well the implementation was able to determine the location of a conforming client. The three walkthroughs 2303, 2305, and 2307 were in what is shown as the horizontal direction in FIG. 23, while the walk-through 2309 is in what is shown as the vertical direction in FIG. 23.

For the horizontal walk-throughs 2303, 2305, and 2307, the standard deviation in the cross direction, being the direction shown as vertical, was used as an indication of the performance. The lowest horizontal walk-though 2303 gave a standard deviation of 15.4 ft. The middle horizontal walk-though 2305 gave a standard deviation of 7.7 ft, while the upper horizontal walk-though 2307 gave a standard deviation of 15.9 ft. For the vertical walk-through 2309, the standard deviation in the cross direction, being the direction shown as horizontal, was used as an indication of the performance. The vertical walk-though 2309 gave a standard deviation of 9.5 ft.

Coverage Hole Determining

Another aspect of the invention is using the location capability of conforming radio tags and client stations to detect and locate coverage holes for an area.

The maximum range for a wireless link is a function of the path loss tolerance. The path loss tolerance for a particular wireless link depends upon the transmit power and the receiver sensitivity. The maximum possible path loss (in dB) can be expressed as the difference between the transmit power and the receiver sensitivity. For example, it is expected that transmitting with a relatively large transmit power leads to relatively large path loss tolerance, which in turn leads to a relatively long range. It likewise is expected that a message transmitted with a relatively low transmit data rate can be received with a receiver with relatively low receiver sensitivity, so that there is a relatively large path loss tolerance, which in turn leads to a relatively long range. Furthermore, transmitting with a lower transmit frequency is expected to lead to less path loss per meter, which in turn would lead to a longer range.

Most wireless networks are configured to operate above the minimum frequency, at a transmit power less than the maximum possible transmit power, and at data rates higher than the minimum data rate. As a result, the maximum range from each access point to the edge of each cell formed by that AP for a typical configuration is significantly less than the maximum possible range.

To locate conforming tags or clients tags at the maximum range, one would configure tags and clients to transmit, using the frame formats described hereinabove, at the maximum possible transmit power, at the lowest possible data rate, e.g., 1 Mbps, and at the lowest possible carrier frequency, e.g., at the 2.4 GHz range rather than at the 5 GHz frequency range. Such a range for location will likely often be well beyond the range for reliable data communication. Therefore, by so transmitting, the maximum range from a compliant radio tag or client to an AP will typically be larger than the radius of the cell for that AP.

The network management software can search through the list of compliant clients or compliant tags to find tags or clients with unreliable communication between themselves and access points, e.g., with an unacceptable packet loss rate and/or throughput properties. Any such compliant tags and clients that are located and that consistently provide unreliable communication form a coverage hole.

Thus the location estimates for those clients are used to build up a record of where coverage holes are within the network.

Figure 24:
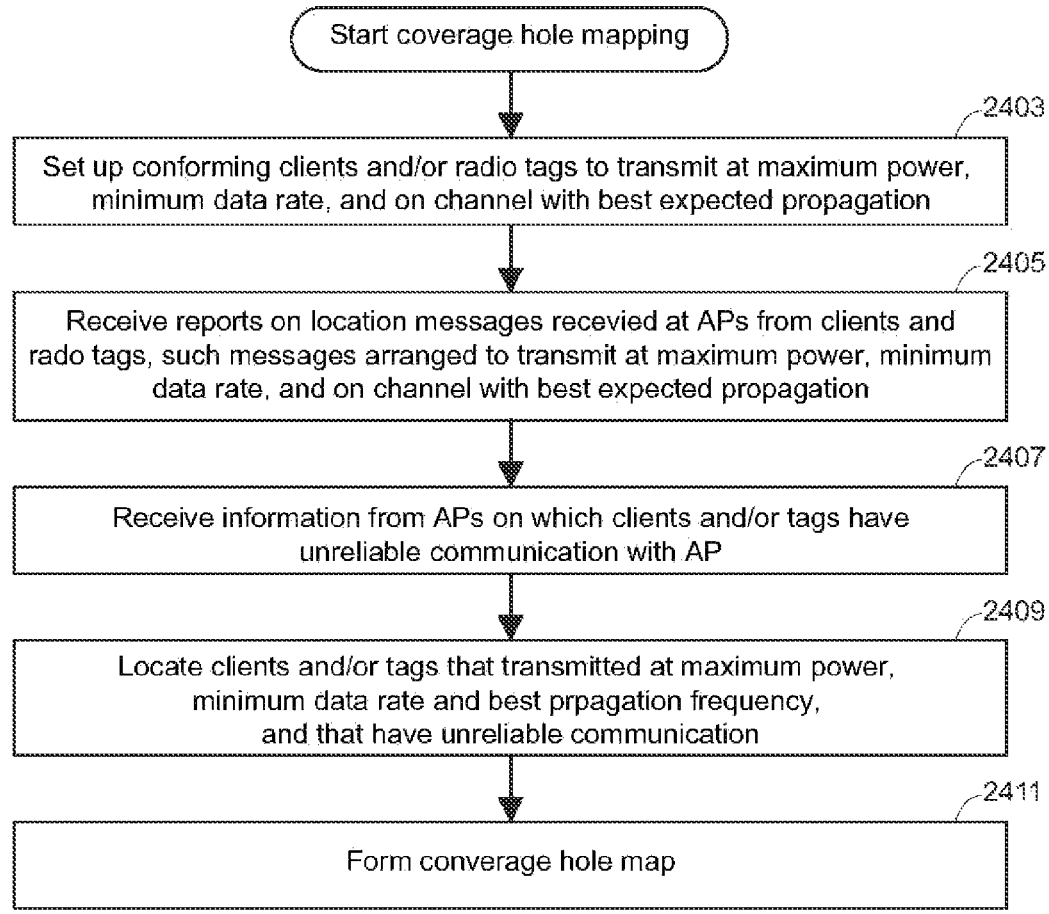
FIG. 24 describes one embodiment of a method implemented in a combined location server and WLAN manager that determines coverage holes using the location determining method of the present invention.

FIG. 24 describes one embodiment of a method implemented in a combined location server and WLAN manager that thus determines a coverage hole. In 2403, the manager sets up conforming clients and/or radio tags to transmit their location messages at the maximum power, at the minimum data rate, and on the frequency channel expected to have the best propagations, e.g., on the lowest frequency, e.g., 2.4 GHz. The APs receive at least some of the location messages. These APs send reports to the location manager. The APs further are arranged to send the location manager reports on which of these clients and/or radio tags the AP had unreliable communication with. In 2405, the location manager receives reports on received location messages from the APs that received the location messages that are transmitted at the maximum power, minimum data rate, and lowest frequency. In 2407, the location manager receives reports from APs on which received location messages included unreliable communication. In 2409, the location manager locates clients and/or tags that transmitted at maximum power, minimum data rate and best propagation frequency, and that have unreliable communication. In 2411, the location manager uses these locations to form a map of coverage holes.

Alternate Location Determining Methods

Alternate embodiments use alternate location determining methods using the location frames described herein. One such alternate method is described in the above-mentioned Kaiser et al. invention of incorporated-by-reference U.S. patent application Ser. No. 10/629,384 titled RADIOLOCATION USING PATH LOSS DATA.

One method embodiment of the Kaiser et al. invention includes accepting an ideal path loss model and calibrating the ideal path loss model using path loss measurements between a first set and a second set of wireless stations of the wireless network in an area of interest. The stations of the first and second sets are at known locations, and are typically APs. The path loss measurements are obtained using measurements received from the first set of wireless stations that measure the received signal strengths at each of the respective wireless station of the first set as a result of transmissions by each wireless station of the second set of wireless stations of the wireless network. Each transmission by a respective station of the second set is at a known respective transmit power. In one embodiment, the first and second sets are identical, and are a set of managed access points of a managed wireless network located in the area of interest. The calibrating determines a calibrated path loss model between the access points. The method further includes measuring the path loss between the wireless station of an unknown location and at least some of the managed access points. In the case that the wireless station is a client station of one of the access points, the measuring includes receiving measurements from the client station measuring the received signal strength as a result of respective transmissions from at least some of the access points, each of the respective transmissions being at a known corresponding transmit power.

According to an aspect of the Kaiser et al. invention, the determining of likely location or locations includes determining a set of likelihood components for each of a set of locations, each component corresponding to a respective access point whose transmissions are listened for at the particular station, and determining an overall likelihood for each of the set of locations as the product of the likelihood components.

In a particular version, the determining of the likely location or locations includes, for each managed access point whose transmitted signal is detected at the particular station, determining an inclusive likelihood component as a function of location using the measured path loss and calibrated path loss for the transmission from the respective managed access point to the particular wireless station, such that each inclusive likelihood component provides an indication of the likelihood at any location that the transmission from the access point whose transmission is detected could have been received at the location with the measured path loss.

Furthermore, in a particular version, the determining of the likely location or locations includes, for each managed access point whose transmitted signal is not detected at the particular station, determining an exclusive likelihood component as a function of location, such that each exclusive likelihood component provides an indication of the likelihood at any location that the transmission from the access point whose transmission is not detected could have been received at the location with an assumed signal strength for the transmitted power.

Furthermore, a particular version of the Kaiser et al invention includes displaying the overall likelihood to a user on a user interface showing the area of interest.

Additional Aspects

Once the location server and the WLAN manager have location information, various methods can be used to improve performance of the network.

Another aspect of the invention is that when the location server senses certain locations, e.g., the location manager instructs the AP serving the client station to instruct a client that is close to a door of exit of a building, to transmit location-finding frames more frequently to provide for more frequent location determination for such a client, since such a client that is close to a door of exit of a building may be out of the building.

Another aspect of the invention is that when an AP first detects the presence of a client, the AP instructs the newly detected client to transmit location-finding frames more frequently to provide for more frequent location determination for such a client.

Another aspect of the invention is that when the location server and/or the WLAN manager senses that a particular client is roaming relatively frequently, the location manager and/or the WLAN manager instructs the AP serving the client station to instruct that client to transmit location-finding frames more frequently to provide for more frequent location determination for such a client.

Another aspect of the invention is that when the location server and/or the WLAN manager determines that a particular client is in one of the coverage holes, the location manager and/or the WLAN manager instructs the AP serving the client station to instruct the client to send location-finding frames at the highest power and lowest data rate to provide for more accuracy in determining location.

According to another aspect of the invention, when a client transmits a location-finding frame, and does not receive any acknowledgment of the location-finding frame from any AP, the client is programmed to send the location-finding frame at the highest power and lowest data rate to provide for more accuracy.

According to yet another aspect of the invention, when a client transmits a location-finding frame, and does not receive any acknowledgment of the location-finding frame from any AP, the client is programmed to ramp up the power in a series of steps until an acknowledgment is received.

Thus has been described a common method for determining the location of radio tags, the location of WLAN client stations, and the location of coverage holes in a WLAN.

Note that while the description herein describes measurements received in conforming access points, the measurements of location may be made by managed clients that are in the locality of the conforming tags.

It should be appreciated that although the invention has been described in the context of the IEEE 802.11 standard, the invention is not limited to such contexts and may be utilized in various other applications and systems. While an embodiment has been described for operation in a WLAN with RF frequencies in the 5 GHz range and 2.4 GHz range (the 802.11a, 802.11b, and 802.11g variants of the IEEE 802.11 standard), the invention may be embodied in receivers and transceivers operating in other RF frequency ranges.

The methodologies described herein are, in one embodiment, performable by a machine which includes a one or more processors that accept code segments containing instructions. For any of the methods described herein, when the instructions are executed by the machine, the machine performs the method. Any machine capable of executing a set of instructions (sequential or otherwise) that specify actions to be taken by that machine are included. Thus, a typical machine may be exemplified by a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. If the processing system requires a display, such a display maybe included, e.g., a liquid crystal Display (LCD) or a cathode ray tube (CRT) display. If manual data entry is required, the processing system also includes an input device such as one or more of an alphanumeric input unit such as a keyboard, a pointing control device such as a mouse, and so forth. The term memory unit as used herein also encompasses a storage system such as a Disk drive unit. The processing system in some configurations may include a sounds output device, and a network interface device. The memory subsystem thus includes a carrier medium that carries machine readable code segments (e.g., software) including instructions for performing, when executed by the processing system, one of more of the methods described herein. The software may reside in the hard Disk, or may also reside, completely or at least partially, within the RAM and/or within the processor during execution thereof by the computer system. Thus, the memory and the processor also constitute carrier medium carrying machine readable code.

In alternative embodiments, the machine operates as a standalone device or may be connected, e.g., networked to other machines, in a networked deployment, the machine may operate in the capacity of a server or a client machine in server-client network environment, or as a peer machine in a peer-to-peer or distributed network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine.

Note that while some diagram(s) only show(s) a single processor and a single memory that carries the code, those in the art will understand that many of the components described above are included, but not explicitly shown or described in order not to obscure the inventive aspect. For example, while only a single machine is illustrated, the term "machine" shall also be taken to include any collection of machines that individually or jointly execute a set (or multiple sets) of instructions to perform any one or more of the methodologies discussed herein.

Thus, one embodiment of each of the methods described herein is in the form of a computer program that executes on a processing system, e.g., a one or more processors that are part of a location server. Thus, as will be appreciated by those skilled in the art, embodiments of the present invention may be embodied as a method, an apparatus such as a special purpose apparatus, an apparatus such as a data processing system, or a carrier medium, e.g., a computer program product. The carrier medium carries one or more computer readable code segments for controlling a processing system to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code segments embodied in the medium.

The software may further be transmitted or received over a network via the network interface device. While the carrier medium is shown in an exemplary embodiment to be a single medium, the term "carrier medium" should be taken to include a single medium or multiple media (e.g., a centralized or distributed database, and/or associated caches and servers) that store the one or more sets of instructions. The term "carrier medium" shall also be taken to include any medium that is capable of storing, encoding or carrying a set of instructions for execution by the machine and that cause the machine to perform any one or more of the methodologies of the present invention. A carrier medium may take many forms, including but not limited to, non-volatile media, volatile media, and transmission media. Non-volatile media includes, for example, optical, magnetic disks, and magneto-optical disks. Volatile media includes dynamic memory, such as main memory. Transmission media includes coaxial cables, copper wire and fiber optics, including the wires that comprise a bus subsystem. Transmission media also may also take the form of acoustic or light waves, such as those generated during radio wave and infrared data communications. For example, the term "carrier medium" shall accordingly be taken to included, but not be limited to, solid-state memories, optical and magnetic media, and carrier wave signals.

It will be understood that the steps of methods discussed are performed in one embodiment by an appropriate processor (or processors) of a processing (i.e., computer) system executing instructions (code segments) stored in storage. It will also be understood that the invention is not limited to any particular implementation or programming technique and that the invention may be implemented using any appropriate techniques for implementing the functionality described herein. The invention is not limited to any particular programming language or operating system.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner, as would be apparent to one of ordinary skill in the art from this disclosure, in one or more embodiments.

Similarly, it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing Disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

It should be appreciated that although the invention has been described in the context of the IEEE 802.11 standard, the invention is not limited to such contexts and may be utilized in various wireless network applications and systems, for example in a network that conforms to a standard other than IEEE 802.11. Furthermore, the invention is not limited to any one type of architecture or protocol, and thus, may be utilized in conjunction with one or a combination of other architectures/protocols. For example, the invention may be embodied in wireless networks conforming to other standards and for other applications, including other WLAN standards, bluetooth, GSM, PHS, CDMA, and other cellular wireless telephony standards.

All publications, patents, and patent applications cited herein are hereby incorporated by reference.

In the claims below and the description herein, the term "comprising" or "comprised of" or "which comprises" is an "open" term that means including at least the elements/features that follow, but not excluding others. The term "including" or "which includes" or "that includes" as used herein is also an "open" term that also means including at least the elements/features that follow the term, but not excluding others. Thus, including is synonymous with and means comprising.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

We claim:

1. A method of operating a processing system, comprising:
    receiving path loss information from at least one wireless station or radio tag of a wireless network, the path loss information from a wireless station or radio tag being for one or more location frames received at the wireless station or radio tag, each received location frame transmitted by a respective radio tag or a respective client station and having a pre-defined frame structure; and
    determining the location of at least one of the wireless client stations or radio tags from the received path loss information using a path-loss based location determining method,
wherein the radio tag or client station uses a common infrastructure for transmitting a location frame, the common intrastrcuture configured for radiolocation by path loss measurement and including a pre-defined protocol common for both radio tags and client stations for transmitting information for reception by the plurality of stations of the wireless network for radiolocation, the pre-defined protocol including using the location frame having the pre-defined frame structure,
wherein a location frame conforming to the pre-defined frame structure includes an identifier that provides for a receiving station to recognize the frame as a frame that includes location information, and
one or both:
    wherein the pre-defined protocol includes a pre-assigned multicast address to be used by transmitting radio tags and client stations to transmit location frames,
    and/or
    wherein a location frame conforming to the pre-defined frame structure is configured to be receivable by one or more substantially standard wireless stations of a substantially standard IEEE 802.11 wireless local area network, and the pre-defined protocol includes one or more extensions to the IEEE 802.11 specifications that provide for client stations and radio tags the pre-defined frame structure for location frames.

2. A method as recited in claim 1, wherein the common infrastructure includes a defined protocol for radio tags to transmit information with relatively low power consumption compared to transmitting normal payload carrying frames.

3. A method as recited in claim 1, wherein the pre-defined protocol includes a pre-assigned multicast address to be used by transmitting radio tags and client stations to transmit location frames.

4. A method as recited in claim 1, wherein the location frames having a pre-defined frame structure are configured to be receivable by one or more substantially standard wireless stations of a substantially standard wireless local area network.

5. A method as recited in claim 4, wherein the substantially standard wireless local area network is an IEEE 802.11 wireless local area network, and wherein the predefined protocol includes one or more extensions to the IEEE 802.11 specifications that provide for client stations and radio tags the pre-defined frame structure for location frames.

6. A method as recited in claim 4, wherein the substantially standard wireless stations are access points of the wireless local area network.

7. A method as recited in claim 4, wherein the radio tag or client station transmitting the one or more location frames includes a transmitter with transmit power calibrated to relative high accuracy.

8. A method as recited in claim 4, wherein the set of receiving stations are access points at known locations, and wherein the location determining further includes:
    providing a propagation model for the selected region to provide a mapping of distance and path loss between pairs of selected access points, the propagation model including a mapping of distance and path loss between pairs of access points;
    providing an array of grid points in the selected region;
    using the propagation model to provide an expected path loss from each selected access point to each grid point; and
    using the expected path loss from each selected access point to each grid point and the provided path loss measurement information to determine a likely location in the selected region of a radio tag or client station that transmitted location frames.

9. A method as recited in claim 1, wherein the radio tag or client does not need to associate or to be associated with an access point in order to transmit a location frame conforming to the pre-defined frame structure.

10. A method as recited in claim 1, wherein the radio tag or client is settable to transmit frames from time to time, the frames conforming to the pre-defined frame format on a single channel, or periodically transmit on a number of channels in succession to a pre-assigned multicast address, the setting including setting one or more of a set of parameters for the transmitting by the radio tag or client, the set of parameters consisting of the single transmission channel or channels for transmitting, a transmit power or powers, one or more intervals between transmissions, and a length or lengths of time of transmissions.

11. A method as recited in claim 10, wherein the setting of the radio tag or client uses software, such that legacy clients that are software upgradable can be upgraded to be able to conform to the infrastructure.

12. A method as recited in claim 1, wherein the location frames having a pre-defined frame structure are configured to be receivable by one or more substantially standard wireless stations of a substantially standard wireless local area network, and wherein the plurality of receiving stations are access points of the wireless network, and wherein the common infrastructure is also for determining gaps in the coverage area of the access points of the wireless network without requiring a map.

13. A method as recited in claim 12,
wherein the pre-defined protocol provides a mechanism to set a radio tag or client to periodically transmit frames conforming to the pre-defined frame format on a single channel, or periodically transmit on a number of channels in succession to a pre-assigned multicast address, the protocol providing a set of parameters for the transmitting by the radio tag or client, including setting at least one parameter of the set consisting of the single transmission channel or channels for transmitting, a transmit power or powers, one or more intervals between transmissions, and a length or lengths of time of transmissions, and
wherein the method further comprises:
determining the gaps in the coverage area including, at an entity of the wireless network:
setting up client stations and/or radio tags to transmit location frames at their respective maximum power;
receiving reports sent by one or more access points that receive the transmitted location frames, the reports including information about received location messages and further about from which clients and/or radio tags the communication was unreliable; and determining the location of the client stations and/or radio tags that transmitted location frames and from which frames were received at one or more access points.

14. A method as recited in claim 13, wherein the setting up of client stations and/or radio tags to transmit location frames includes setting up the client stations and/or radio tags to transmit at their respective minimum data rate, and on the frequency channel expected to have the best propagations.

15. A method as recited in claim 13, further comprising:
ascertaining whether or not a particular client is in a coverage gap; and
in the case that it is ascertained that the particular client is in a coverage gap, ascertaining which access point is serving the client station, and instructing the ascertained access point to instruct the particular client station to transmit location-finding frames more frequently to provide for more frequent location determination for the particular client station.

16. A method as recited in claim 13,
ascertaining whether or not a particular client is at a coverage gap;
in the case that it is ascertained that the particular client is in a coverage gap, ascertaining which access point is serving the client station, and instructing the ascertained access point to instruct the particular client station to transmit location frames at the highest power and lowest data rate to provide for more accuracy in determining location.

17. A method comprising:
receiving information at a plurality of stations of a wireless network using a pre-defined protocol, the information in location frames having a pre-defined frame structure and transmitted by one or more transmitters, each transmitter in a radio tag or client station of the wireless network;
using path loss information from the location frames to determine the location of the one or more transmitting transmitters,
wherein the pre-defined protocol is part of a common infrastructure for radio tags and client stations of the wireless network to be located using radiolocation by path loss measurement,
wherein the pre-defined protocol includes a pre-assigned multicast address to be used by transmitting radio tags and client stations to transmit location frames,
and/or
wherein a location frame conforming to the pre-defined frame structure is configured to be receivable by one or more substantially standard wireless stations of a substantially standard IEEE 802.11 wireless local area network, and the pre-defined protocol includes one or more extensions to the IEEE 802.11 specifications that provide for client stations and radio tags the pre-defined frame structure for location frames.

18. A method as recited in claim 17, wherein the common infrastructure includes a pre-defined protocol for radio tags to transmit information with relatively low power consumption compared to transmitting normal payload carrying frames.

19. A method as recited in claim 17, wherein the location frames having a pre-defined frame structure are configured to be receivable by one or more substantially standard wireless stations of a substantially standard wireless local area network.

20. A method as recited in claim 17, wherein the pre-defined frame structure for location frames includes an indication of the transmit power used to transmit the location frame.

21. A method comprising:
in a client station of a wireless station or a radio tag, the client station or radio tag including a transmitter of frames that conform to a wireless network standard, transmitting location frames having a pre-defined frame structure and including information for reception by a plurality of stations of the wireless network, the location frames substantially conforming to frames of the wireless network standard,
wherein the predefined frame structure is designed for conveying information needed to locate radio tags and clients using path loss measurements,
wherein the location frames having a pre-defined frame structure are configured to be receivable by one or more substantially standard wireless stations of a substantially standard IEEE 802.11 wireless local area network, and
the pre-defined frame structure for location frames is defined by one or more extensions to the IEEE 802.11 specifications that provide pre-defined frame structure for client stations and radio tags,
such that the radio tags or client station can be located using radiolocation by path loss measurement between the radio tag or client station and the receiving stations.

22. A method as recited in claim 21, wherein a location frame conforming to the pre-defined frame structure includes an identifier that provides for a receiving station to recognize the frame as a frame that includes location information.

23. An apparatus for inclusion in a client station of a wireless station or in a radio tag, the apparatus comprising:

a transmitter configured to transmit frames that conform to a wireless network standard, and further configured to transmit location frames having a pre-defined frame structure and including information for reception by a plurality of stations of the wireless network, the location frames substantially conforming to frames of the wireless network standard, wherein the predefined frame structure includes an identifier that provides for a receiving station to recognize the frame as a frame that includes location information and includes an indication of the transmit power, such that the location frame conveys information usable to locate radio tags and clients using path loss measurements, such that the radio tag or client station can be located using radiolocation by path loss measurement between the radio tag or client station and the receiving stations, and one or both:

wherein the transmitting of location frames is according to a pre-defined protocol common for both radio tags and client stations, the pre-defined protocol includes a pre-assigned multicast address to be used by transmitting radio tags and client stations to transmit location frame, and/or wherein a location frame conforming to the pre-defined frame structure is configured to be receivable by one or more substantially standard wireless stations of a substantially standard IEEE 802.11 wireless local area network, and the pre-defined frame structure for location frames is defined by one or more extensions to the IEEE 802.11 specifications that provide pre-defined frame structure for client stations and radio tags.

* * * * *